Figure 1:
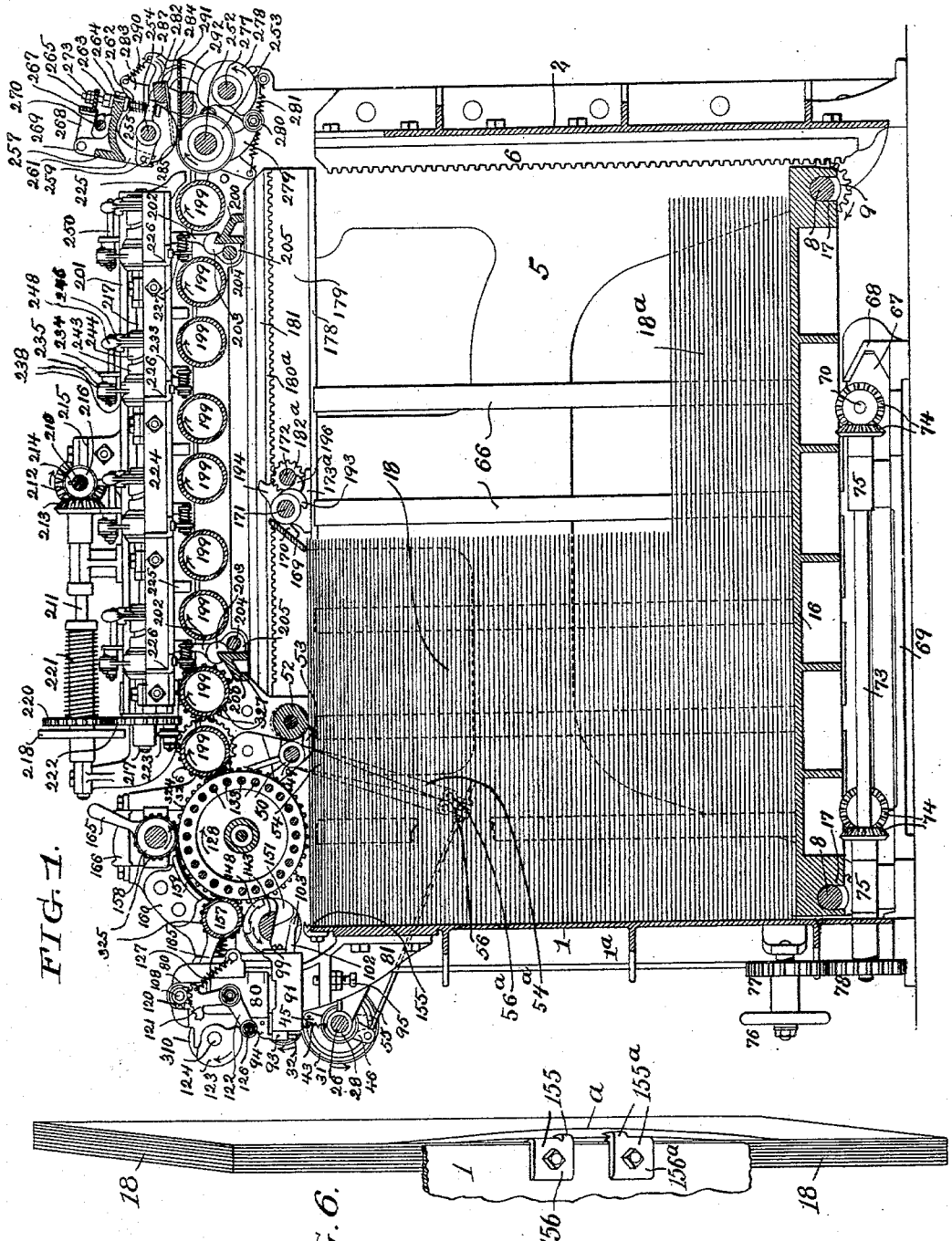

(No Model.) 12 Sheets—Sheet 1.

J. H. KNOWLES.
SHEET SEPARATING AND FEEDING MACHINE.

No. 559,804. Patented May 12, 1896.

WITNESSES:

INVENTOR:
John H. Knowles

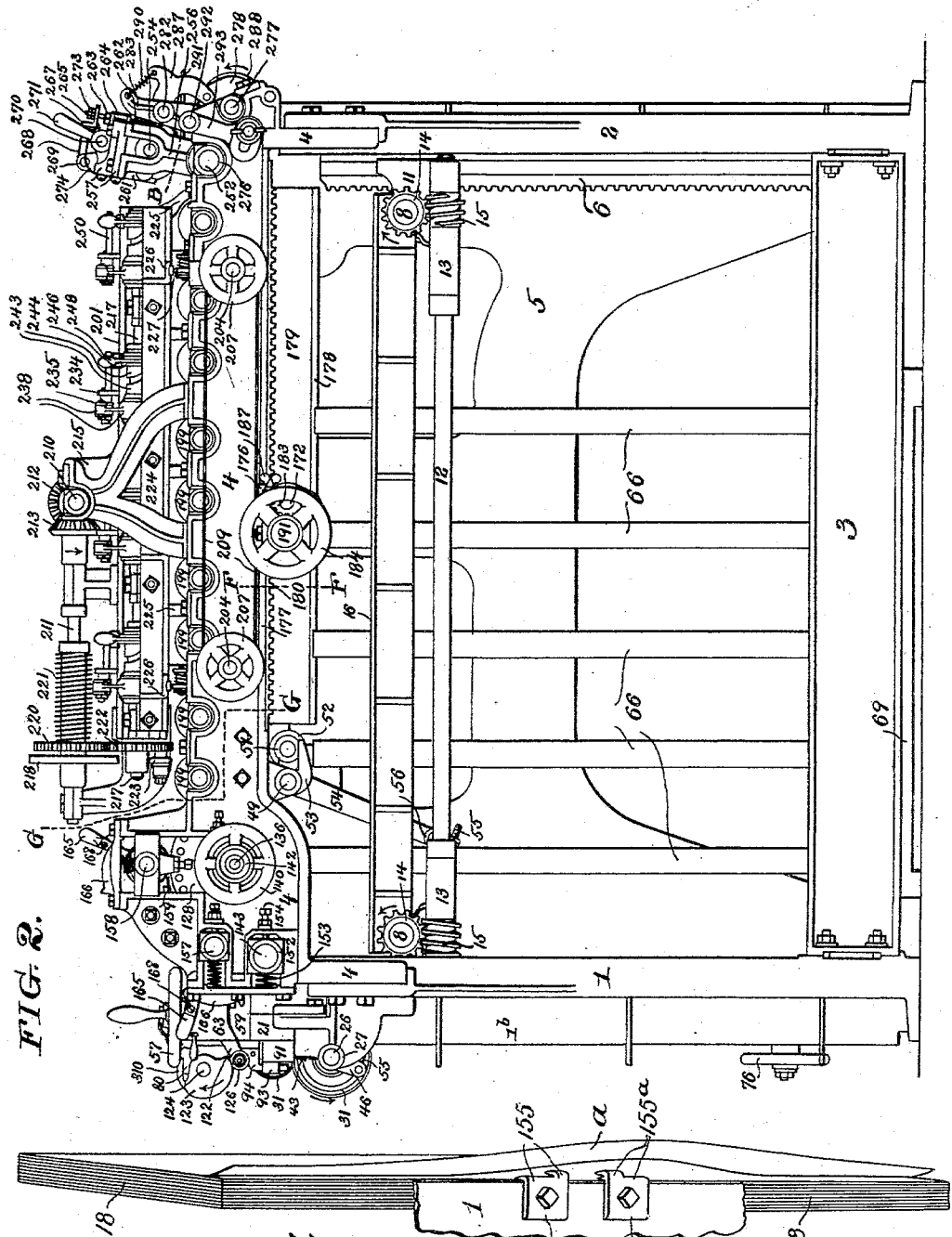

(No Model.) 12 Sheets—Sheet 3.

J. H. KNOWLES.
SHEET SEPARATING AND FEEDING MACHINE.

No. 559,804. Patented May 12, 1896.

WITNESSES: INVENTOR:
John H. Knowles

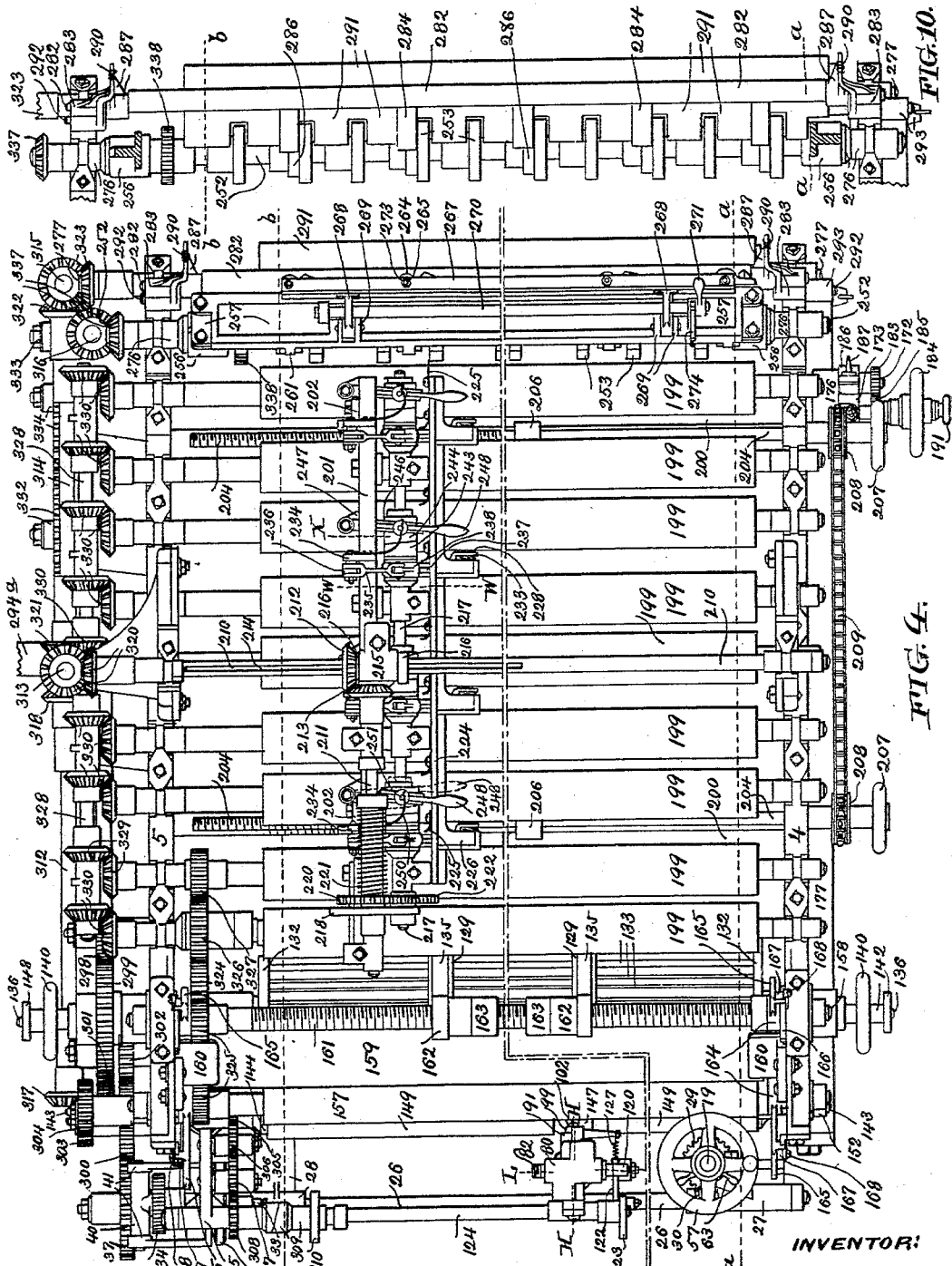
(No Model.) 12 Sheets—Sheet 4.
J. H. KNOWLES.
SHEET SEPARATING AND FEEDING MACHINE.
No. 559,804. Patented May 12, 1896.

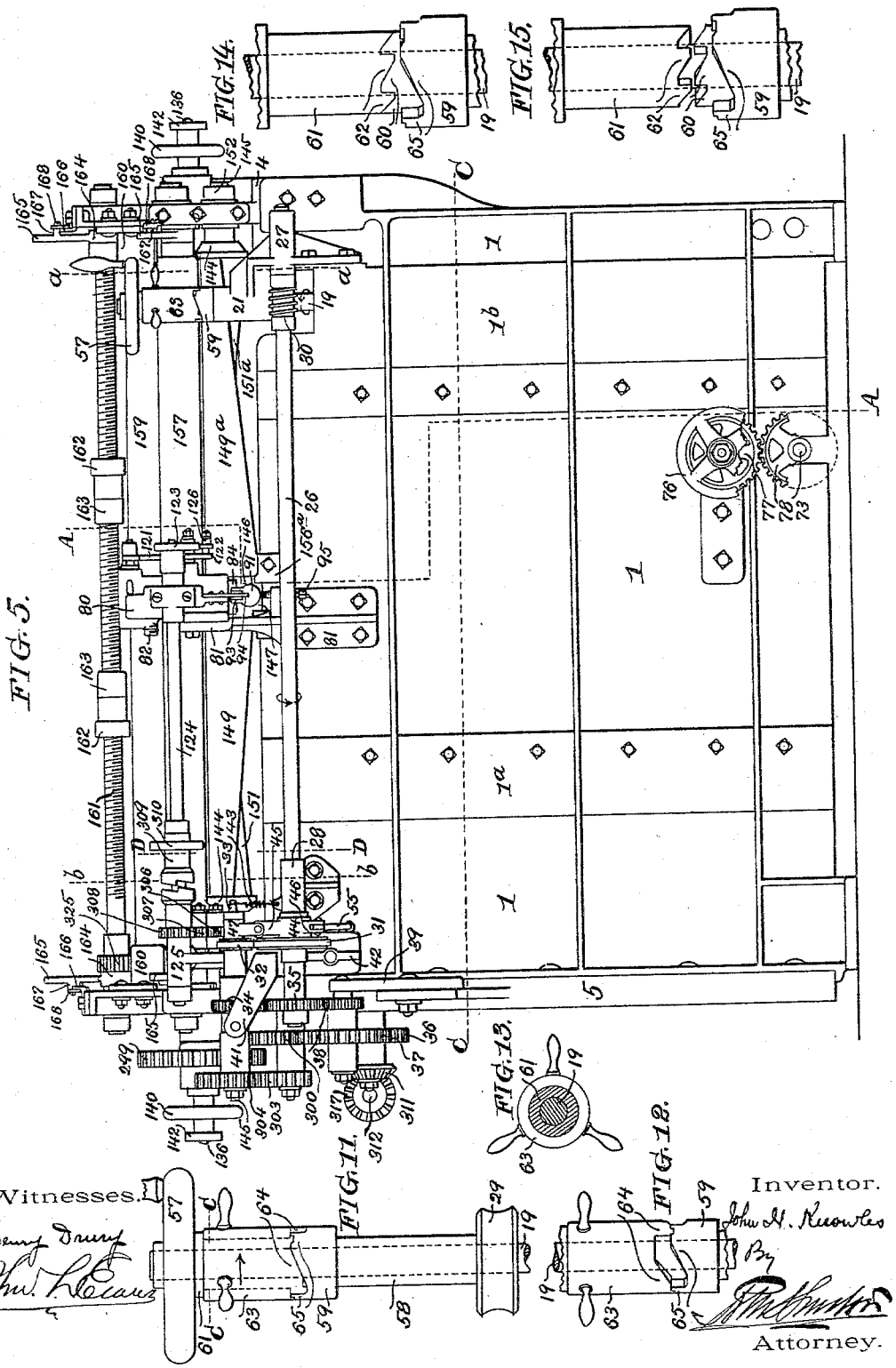

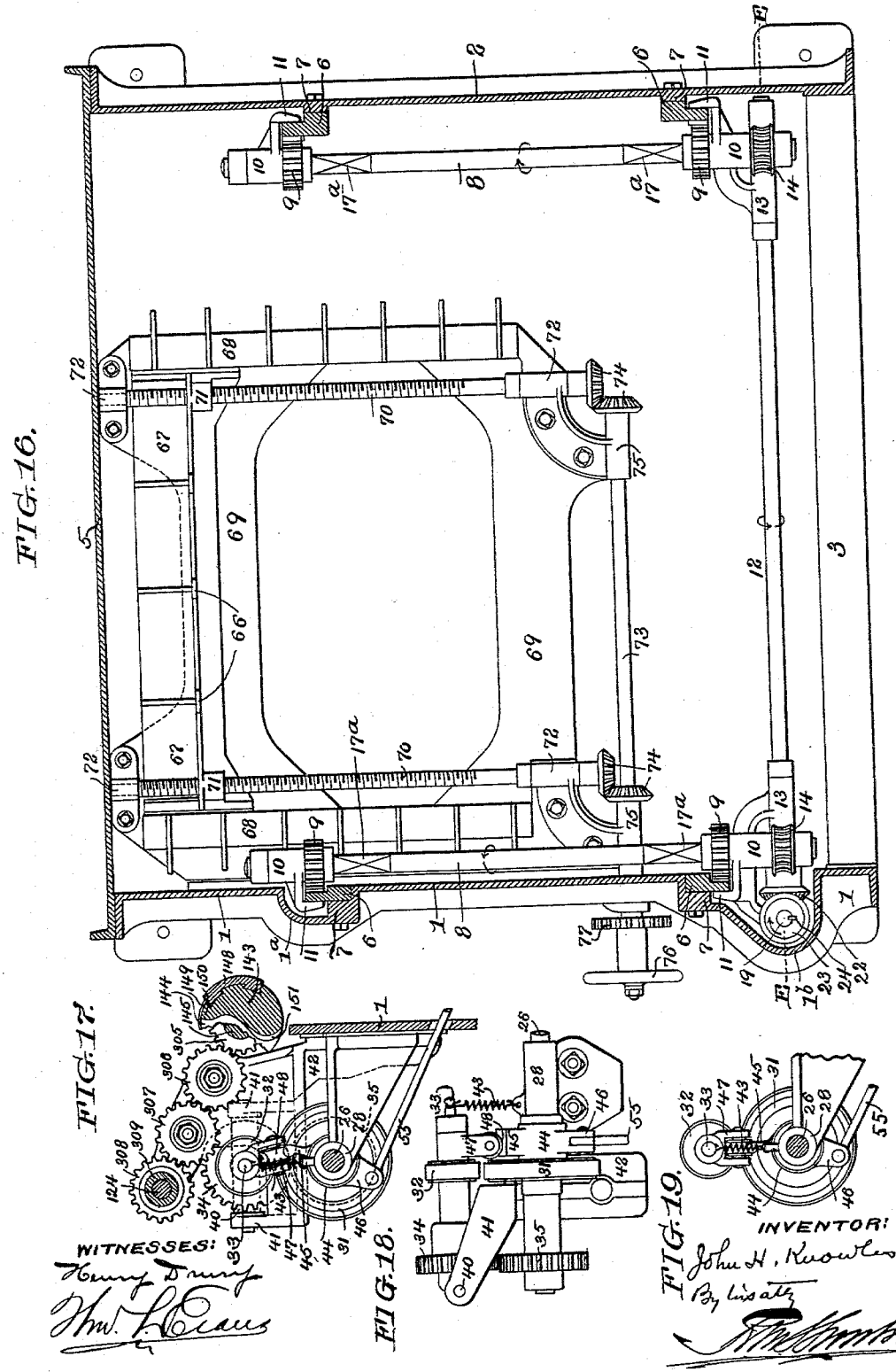

(No Model.) 12 Sheets—Sheet 7.
J. H. KNOWLES.
SHEET SEPARATING AND FEEDING MACHINE.
No. 559,804. Patented May 12, 1896.
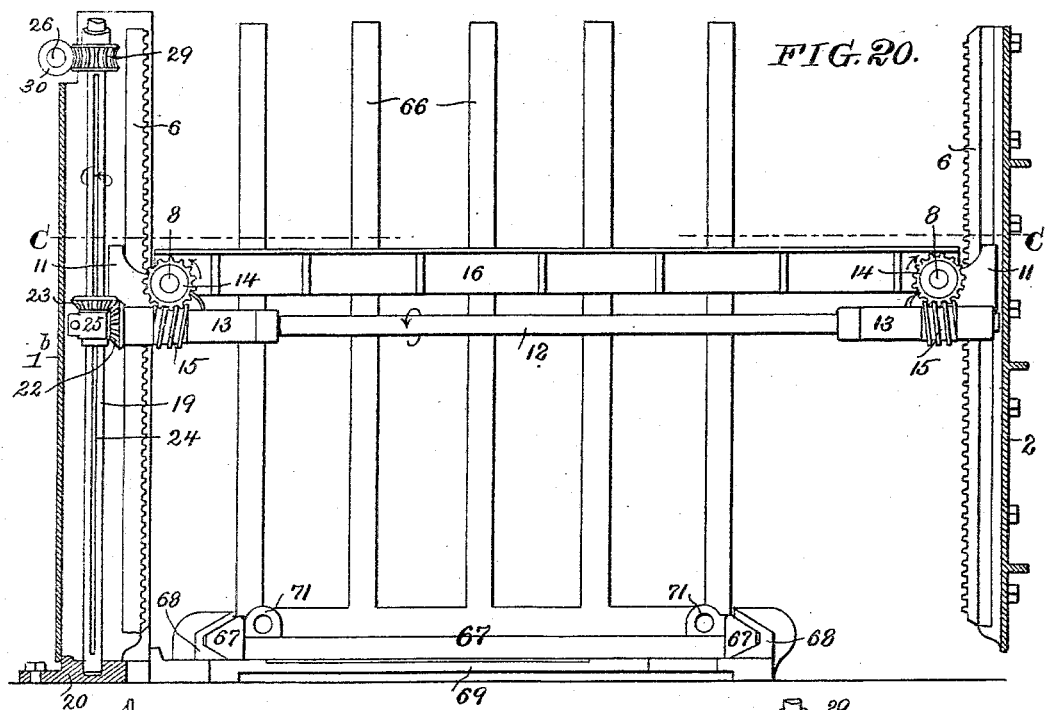
FIG. 20.
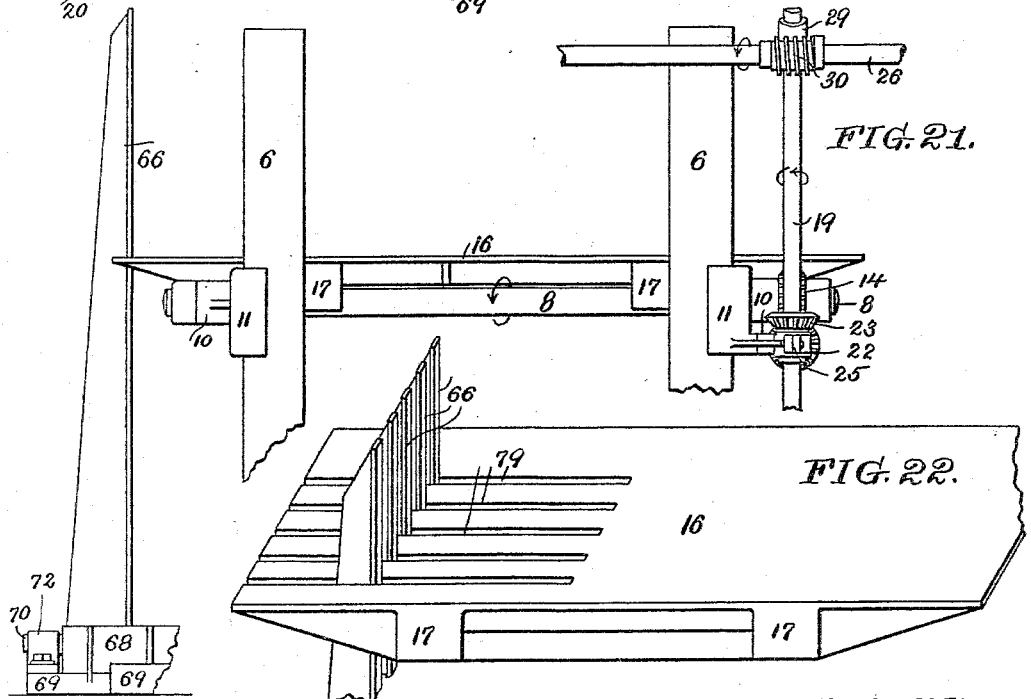
FIG. 21.
FIG. 22.
WITNESSES: INVENTOR:
John H. Knowles (No Model.) 12 Sheets—Sheet 8.
J. H. KNOWLES.
SHEET SEPARATING AND FEEDING MACHINE.
No. 559,804. Patented May 12, 1896.
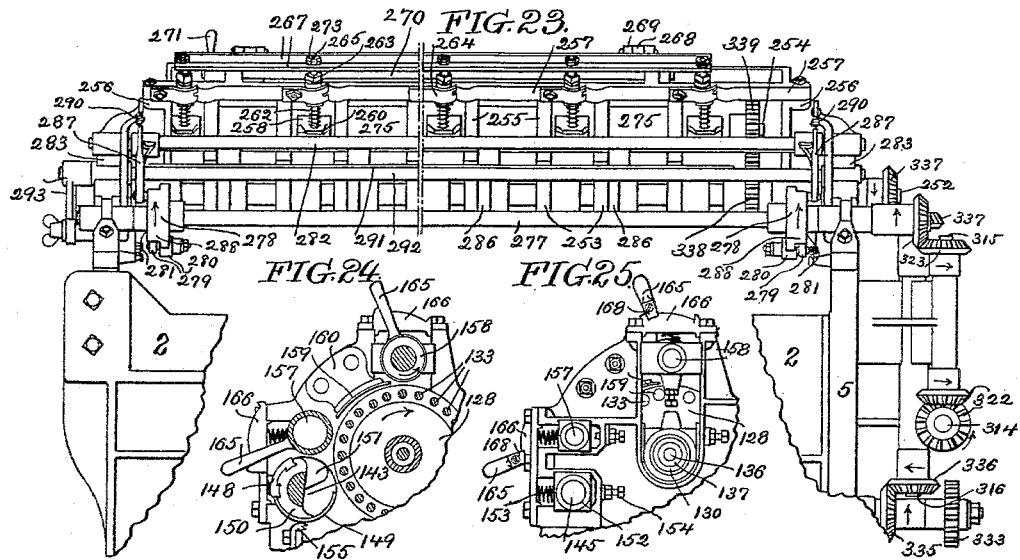
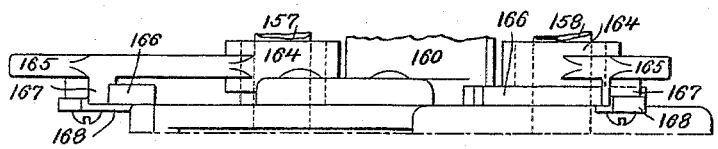
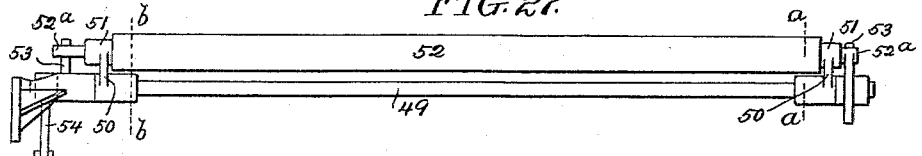
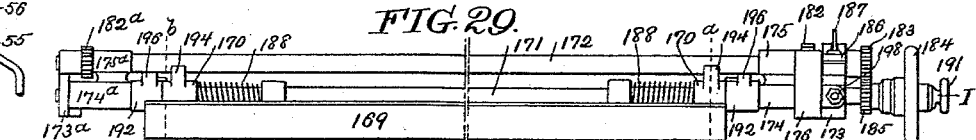
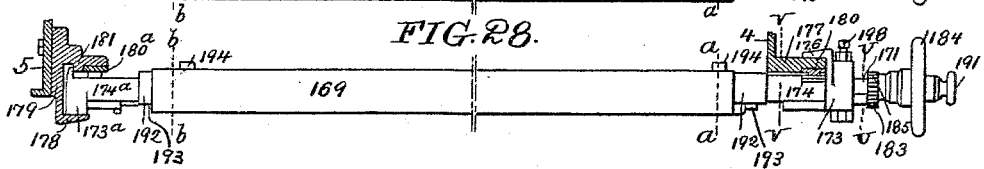
Witnesses.
Henry Drury
Thn. L. Evans
Inventor.
John H. Knowles
By
Attorney.

(No Model.) 12 Sheets—Sheet 9.
J. H. KNOWLES.
SHEET SEPARATING AND FEEDING MACHINE.
No. 559,804. Patented May 12, 1896.
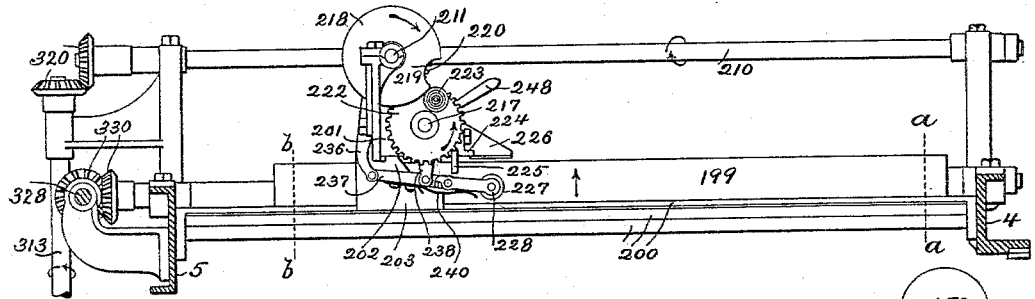
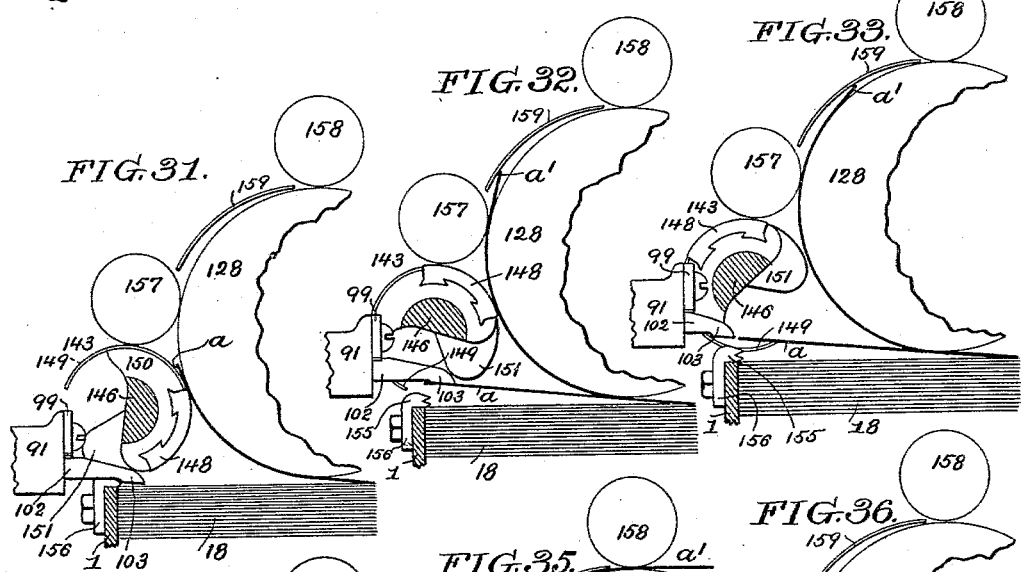
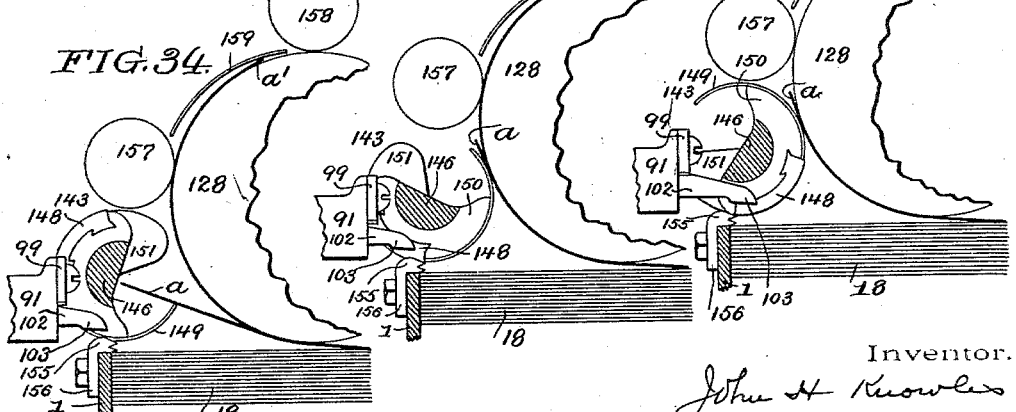
WITNESSES:
Inventor.
John H. Knowles
By
Attorney (No Model.) 12 Sheets—Sheet 10.

J. H. KNOWLES.
SHEET SEPARATING AND FEEDING MACHINE.

No. 559,804. Patented May 12, 1896.

Witnesses. Inventor.
John H. Knowles
By
Attorney.

(No Model.) 12 Sheets—Sheet 11.
J. H. KNOWLES.
SHEET SEPARATING AND FEEDING MACHINE.
No. 559,804. Patented May 12, 1896.
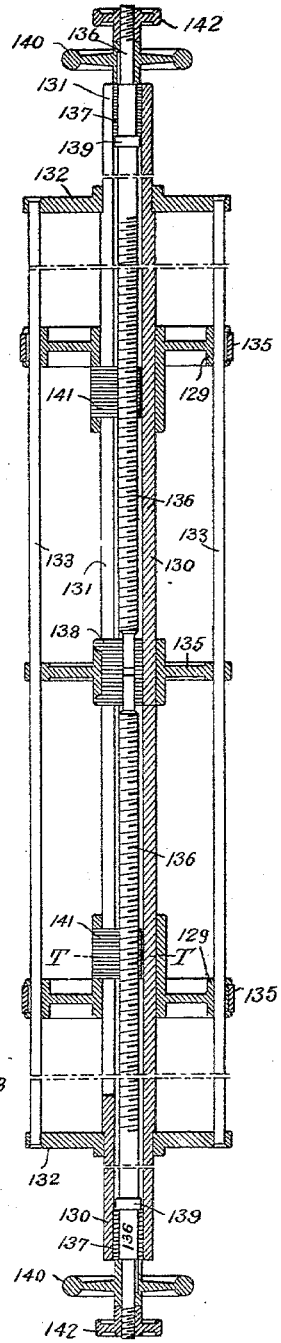

(No Model.) 12 Sheets—Sheet 12.
J. H. KNOWLES.
SHEET SEPARATING AND FEEDING MACHINE.
No. 559,804. Patented May 12, 1896.
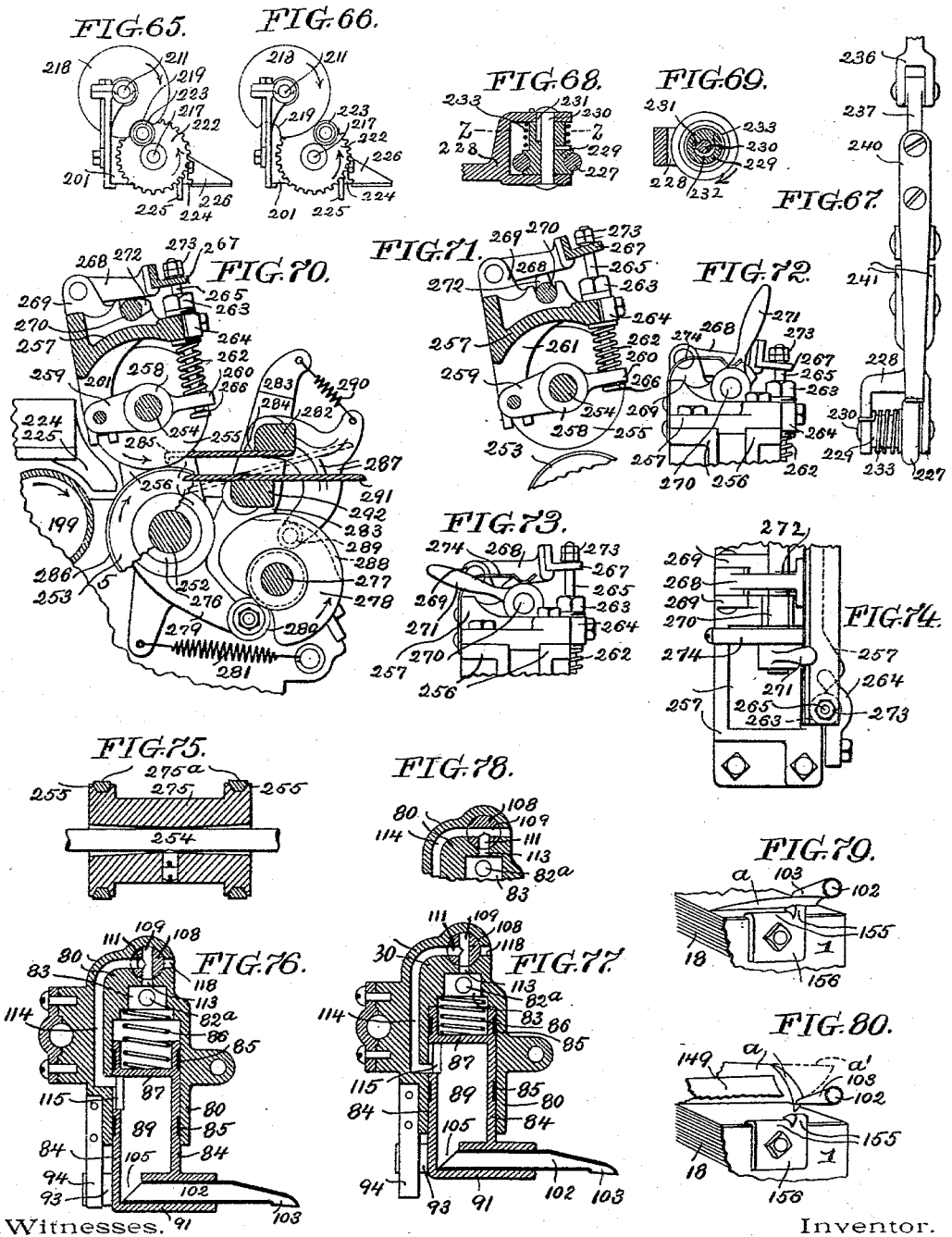
Witnesses.
Inventor.
John H. Knowles
By
Attorney

UNITED STATES PATENT OFFICE.

JOHN HENRY KNOWLES, OF PHILADELPHIA, PENNSYLVANIA.

SHEET SEPARATING AND FEEDING MACHINE.

SPECIFICATION forming part of Letters Patent No. 559,804, dated May 12, 1896.

Application filed September 14, 1895. Serial No. 562,544. (No model.)

*To all whom it may concern:*

Be it known that I, JOHN HENRY KNOWLES, of the city and county of Philadelphia and State of Pennsylvania, have invented an Improvement in Mechanism for Feeding Sheets of Paper, &c., of which the following is a specification.

My invention relates to mechanism for separately removing sheets of paper, &c., from a pack or pile and delivering them singly to any machine to which it is desired to supply successive sheets.

I have shown my invention embodied in an organized machine designed for separating the sheets from the pack or pile and delivering them in an accurately-registered condition to the machine to be fed; but the mechanism may, if desired, be embodied in and become a part of the machine which acts upon the separately-fed sheets.

My machine embraces improvements in the devices for supporting and gradually elevating the pack as sheets are successively removed therefrom, and in means for adjusting the pack laterally.

My invention also embraces improvements in the devices for individualizing sheets and for withdrawing them as they are successively individualized, and includes a novel device for clamping the rear edges of the sheets in the pack to prevent the disturbance of underlying sheets while the uppermost sheet is being withdrawn.

My invention also includes a device for registering the sheets while they are upon a conveyer after they have been removed from the pack or pile, and mechanism for accurately spacing the sheets and removing them from the conveyer.

In addition to these improvements my invention also includes other features of construction and combination of parts, which are fully set forth and claimed hereinafter.

I shall now refer to the accompanying drawings for the purpose of more particularly describing my invention.

Figure 3:
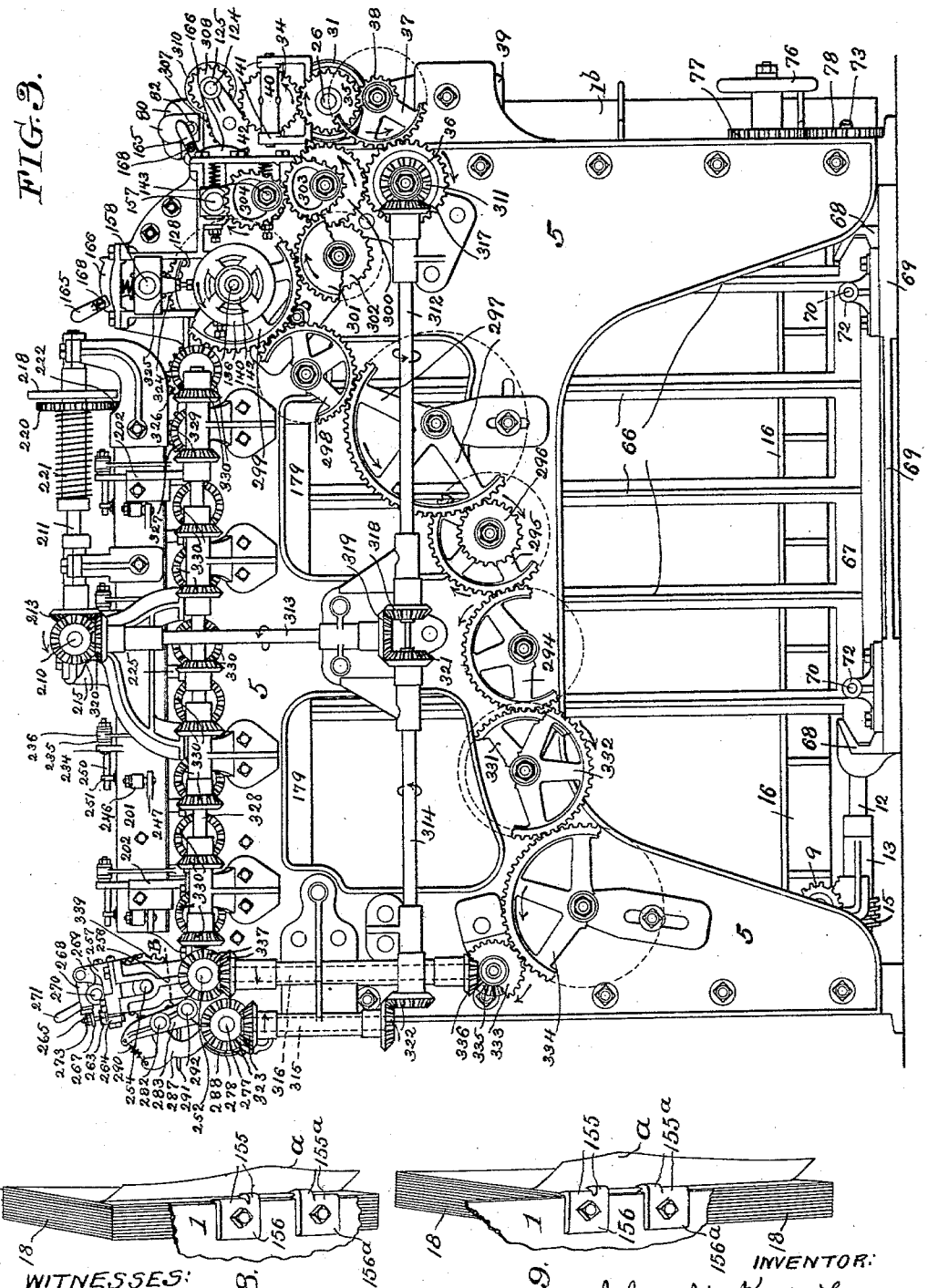
Figure 37:
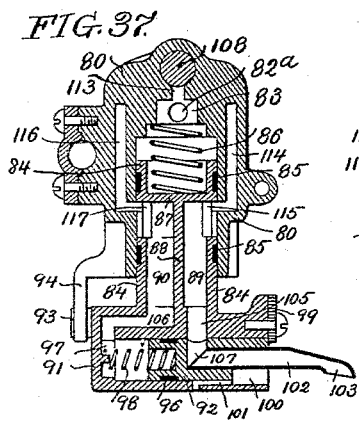
Figure 38:
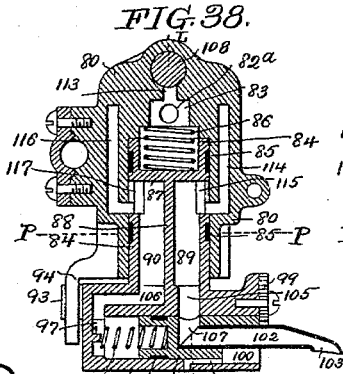
Figure 39:
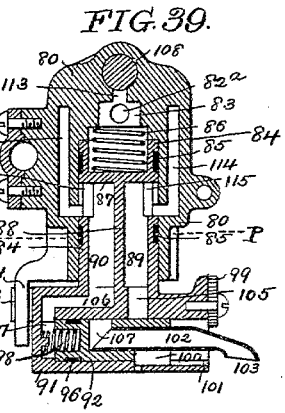
Figure 40:
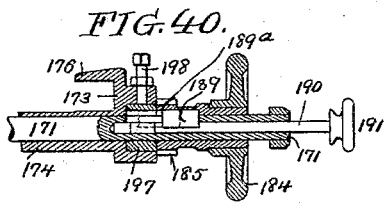
Figure 41:
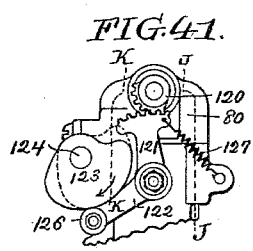
Figure 42:
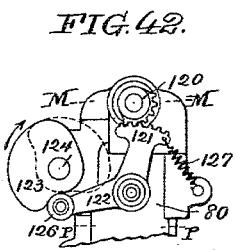
Figure 45:
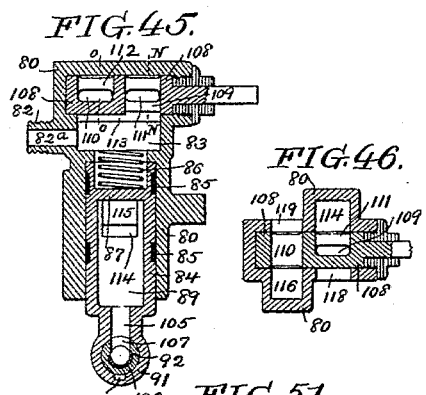
Figure 44:
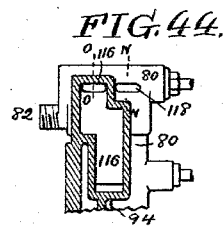
Figure 43:
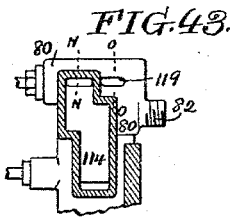
Figure 46:
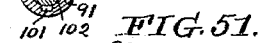
Figures 51, 52:
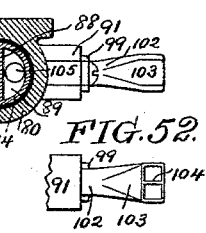
Figures 47, 49:
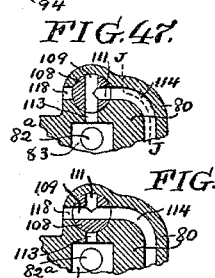
Figures 48, 50:
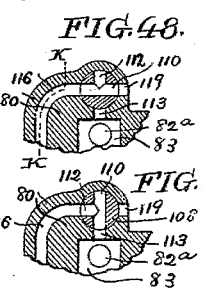

Figure 1 is a longitudinal vertical section of my machine for feeding sheets of paper, &c., taken on the line A A, Fig. 5. Fig. 2 is a side elevation of the machine. Fig. 3 is a view similar to Fig. 2 of the opposite side of the machine. Fig. 4 is a plan view of the machine. Fig. 5 is a front elevation of the machine. Figs. 6, 7, 8, and 9 are perspective views of the pack of sheets and of a portion of the front of the machine. Fig. 10 is a horizontal section of a portion of the machine on line B, Figs. 2 and 3. Figs. 11 and 12 are elevations showing a detail of the table-elevating mechanism in two positions. Fig. 13 is a horizontal section on the line C C, Fig. 11. Figs. 14 and 15 are views similar to Figs. 11 and 12 with the sleeve 63 removed. Fig. 16 is a horizontal section taken on the line C C, Figs. 5 and 20, with the table-plate removed. Fig. 17 is a vertical section on the line D D, Fig. 5, looking to the left. Fig. 18 is a front elevation of parts shown in Fig. 17. Fig. 19 is a view similar to a portion of Fig. 17, but showing parts in a different position. Fig. 20 is a longitudinal vertical section on the line E E, Fig. 16, with portions of the machine removed. Fig. 21 is a front elevation of some of the parts shown in Fig. 20. Fig. 22 is a perspective view of the pack-supporting table. Fig. 23 is a rear elevation of a portion of the machine. Figs. 24 and 25 are views similar to portions of Figs. 1 and 2, respectively, but showing parts in different positions, and in Fig. 25 the parts 140 and 142 shown in Fig. 2 are removed. Fig. 26 is a plan view of certain parts shown in Fig. 4 enlarged. Fig. 27 is a plan view of a portion of the controlling device for the table-elevating mechanism. Fig. 28 is a transverse vertical section on the line F F, Fig. 2, looking to the right and showing details of the rear-edge-clamping device. Fig. 29 is a plan view of parts shown in Fig. 28. Fig. 30 is a transverse vertical section on the line G G, Fig. 2, looking to the right and showing details of the registering device. Figs. 31, 32, 33, 34, 35, and 36 are vertical sections taken on the same line as Fig. 1, and showing certain parts of the individualizing and withdrawing devices in different positions and on a scale enlarged from Fig. 1. Figs. 37, 38, and 39 are vertical sections taken on the line H H, Fig. 4, showing parts of the pneumatic individualizer in different positions. Fig. 40 is a vertical section on the line I, Fig. 29, but showing parts in a different position. Figs. 41 and 42 are side elevations of the upper portions of the pneumatic individualizer, showing parts in different positions. Fig. 43 is a vertical section on the line J J, Figs. 41 and 47. Fig. 44 is a vertical section on the line K K, Figs. 41 and 48. Fig. 45 is a vertical section taken on the line L L, Figs. 4 and 38, looking toward the right. Fig. 46 is a horizontal section on the line M M, Fig. 42. Figs. 47 and 48 are vertical sections on the lines N N and O O, respectively, Figs. 43, 44, and 45. Figs. 49 and 50 are views similar to Figs. 47 and 48, but showing the air-valve in different positions. Fig. 51 is a horizontal section on the line P P, Figs. 38 and 42. Fig. 52 is a view looking upward from below parts shown in Fig. 51. Fig. 53 is a transverse section of the roller 143, taken on the line Q Q, Figs. 54 and 55. Figs. 54 and 55 are plan views of the roller 143, looking in the direction indicated by the arrows R and S, respectively, in Fig. 53. Fig. 56 is a longitudinal section of the withdrawing-drum. Fig. 57 is a transverse section on the line T T, Fig. 56. Fig. 58 is a view showing portions of the rear-edge-clamping device on an enlarged scale, but in the same position that they are shown in Fig. 1. Fig. 59 is a view similar to Fig. 58, but showing parts in a different position. Fig. 60 is a transverse vertical section on the line U U, Fig. 28, looking to the left. Fig. 61 is a transverse vertical section on the line V V, Fig. 28, looking to the right. Figs. 62 and 63 are transverse vertical sections, on an enlarged scale, on the line W W, Fig. 4, looking to the right, and showing parts of the registering device in different positions. Fig. 64 is an enlarged transverse vertical section on the line X, Fig. 4, looking to the right, and showing a detail of the registering device. Figs. 65 and 66 are views showing parts of the registering device in positions different from that in which they are shown in Fig. 30. Fig. 67 is a bottom view of parts shown in Figs. 62 and 63. Fig. 68 is a horizontal section on the line Y, Fig. 63. Fig. 69 is a vertical section on the line Z Z, Fig. 68. Fig. 70 is a view similar to a portion of Fig. 1, enlarged, and showing parts in a different position. Fig. 71 is a view similar to a portion of Fig. 70, but showing parts in another position. Figs. 72 and 73 are views similar to a portion of Fig. 2, enlarged, and showing parts in different positions. Fig. 74 is a plan view of parts shown in Fig. 72. Fig. 75 is a longitudinal section of one of the spools 275. Figs. 76, 77, and 78 are views corresponding to Figs. 37, 38, and 49, respectively, and showing a modification of the pneumatic individualizer; and Figs. 79 and 80 are perspective views of a corner of a pack of sheets, illustrating the operation of the modified individualizer.

The general arrangement of this machine is such that the sheets are removed from that end of the pack opposite to the mechanism to be supplied with sheets and are then turned over upon a conveyer located over the pack, upon which they are registered and spaced out and from which they are delivered at a point but slightly in the rear of the rear end of the pack. By this arrangement an economy of floor-space is effected as compared with such sheet-feeding machines as remove the sheets from the rear of the pack and pass them over carriers extending rearwardly from the pack. By my arrangement a floor-space is required for the machine but slightly greater than the length of the sheets to be fed.

In Figs. 4, 5, 10, 27, 28, 29, and 30 the dotted lines $a\,a$ and $b\,b$ indicate the positions occupied by the side edges of the widest sheets which the machine is adapted to handle.

For the purpose of enabling the detailed construction of the machine to be easily understood I shall refer to the different portions separately.

*The frame of the machine.*—The supporting-framework of the machine may be of any suitable construction. As here shown, it consists of front and rear plates 1 and 2, respectively, connected together on the one side by the girth 3 and the arched truss 4 and on the other side by the side frame 5.

The machine is closed on all sides except that shown in Fig. 2, upon which side the sheets are introduced between the girth 3 and truss 4 and are placed in a pile upon the supporting-table. The side shown in Fig. 2 may be called the "operative side" of the machine.

*The pack-elevating mechanism.*—6 6 6 6 are vertically-arranged gear-racks secured to posts 7 7 7 7, which may form parts of the front and rear plates 1 and 2. (See Figs. 16 and 20.) The inner surface of the front plate 1 constitutes the front gage against which the end of the pack of sheets is alined, and on this end of the machine I have placed the racks 6 6, in offsets formed in the front plate, so that the racks may not interfere with the alinement of the end of the pack. The front plate 1 may be bowed around these offsets and about the vertical driving-shaft of the elevating mechanism, as at $1^a$ and $1^b$. I have arranged the racks 6 so that a portion of the back of the racks shall be free from contact with the posts 7 7.

8 8 are horizontal shafts journaled in bearings 10 and extending transversely one at each end of the machine. Each shaft 8 carries two gears 9 9, which engage corresponding racks 6 6.

12 is a horizontal shaft extending longitudinally adjacent to the operative side of the machine below the shafts 8 8, and is connected with those shafts, so as to move with them when they move over the racks 6, and it may be so connected by means of bearings 13 13, in which the shaft 12 is journaled and each of which is attached to or forms part of a bearing 10 of a shaft 8.

15 15 are oppositely-threaded worms on the ends of the shaft 12, each engaging a worm-wheel 14 on the adjacent shaft 8, by which the shafts 8 8 are rotated when the shaft 12 is turned. When the shafts 8 8 rotate, the gears 9 turn in the racks 6 and thus raise and lower the shafts 8 8 and the parts carried thereby.

A table or platen 16 of any suitable construction is supported by the shafts 8 8 and carries the pack of sheets 18. As shown, the table 16 consists of a metal plate provided with inverted-V-shaped bearings 17, Fig. 1, spanning the shafts 8 8 at points indicated by crossed lines 17$^a$ in Fig. 16. In Fig. 1 the sheets 18$^a$ represent the longest sheets which the machine will feed. The upper part of the pack in Fig. 1 represents shorter sheets.

The bind between the worm-wheels 14 and the worms 15 forms a lock to prevent the accidental turning of the shafts 8 and to cause the table 16 to be sustained in any position it may chance to occupy, the weight of the table and the pack thereon being supported, through the medium of the shafts 8, gears 9, and racks 6, by the posts 7.

From the bearings 10 may project arms terminating in flanges 11, which embrace the free margins of the racks 6 and are adjusted to hold the shafts 8 8 with the gears 9 in mesh with the racks 6. While the employment of these flanges 11 is desirable to secure the steady movement of the gears over the racks, their use is not essential, as the gears would be held against the racks by the bearings 17 of the pack-table.

The shaft 12 may be driven by a vertical shaft 19, arranged adjacent to an end of the shaft 12 (see Figs. 16 and 20) and supported by a step-bearing 20 at its lower end and by a bearing 21 at its upper end carried by the end plate 1, Fig. 5.

22 is a bevel-gear fast on the end of the shaft 12, gearing with a bevel-gear 23, mounted on the shaft 19. The gear 23 is free to move longitudinally on the shaft 19 while maintaining driving connection therewith by a key in its hub engaging a longitudinal keyway 24 in the shaft. (See Figs. 16 and 20.) The gear 23 is bound to the gear 22, so as to remain in mesh therewith during the vertical movement of the gear 22, by means of a bearing 25, connected to or forming part of the bearing 10 of a shaft 8 and encircling the hub of the gear 23 and adapted to move the gear 23 vertically on the shaft 19 when the shaft 8 is moved vertically.

The shaft 19 may be driven through the medium of a worm 29 and worm-wheel 30 by a horizontal shaft 26, supported by bearings 27 28, carried by the front end plate 1. (See Figs. 4, 5, and 20.)

The shaft 26 is driven by frictional disks 31 and 32, provided with proper frictional surfaces and running in contact. The disk 31 is fast on the shaft 26 and the disk 32 is carried by a stud 33. (See Figs. 5, 17, and 18.)

34 is a gear mounted on the stud 33 and secured to the disk 32, so as to turn with it. The gear 34 is driven by a gear 35, turning loosely on the shaft 26. The gear 35 is driven from a gear 36 (see Fig. 3) through the medium of compounded intermediate gears 37 38, which are secured each to the other, so as to turn together upon a stud carried by the adjustable stud-plate 39, which is adjustably secured to an extension of the side frame 5.

When the various driving parts described move in the directions indicated by arrows, the pack-table is raised. By varying the size of the gears 37 or 38 the rate of movement of the pack-table may be varied.

Owing to the difficulty of adjusting the rate of movement of the table 16 to suit the precise thickness of the sheets in the packs it is usual to adjust its rate of movement somewhat in excess of the rate at which the height of the pack is reduced by the withdrawal of sheets and to provide means to stop the movement of the table whenever it moves too far upward. I regulate the rise of the table by providing means for separating the disks 31 32, such separating means being controlled by a feeler (shown in the drawings as a small roller) resting upon the top of the pack.

The stud 33, which carries the disk 32, is fixed at one end in a horizontally-arranged bar 40, which, together with the attached stud 33, is free to oscillate about pivots extending through ears 41, carried by a bracket 42, secured to front plate 1. A spring 43 between the stud 33 and a stationary part normally draws the stud downward and holds the disks 31 and 32 in contact. When the free end of the stud 33 is elevated, the disk 32 is raised from the disk 31, (see Fig. 18,) and thereafter, while the disk 32 may continue turning, the disk 31 and parts driven therefrom will remain at rest until the disk 32 is again placed in contact with disk 31.

44 is an oscillating lever mounted loosely on the shaft 26 or upon an extension of the bearing 28 and provided with arms 45 and 46.

47 is an arm mounted loosely upon the stud 33 near its free end. The arm 45 of the lever 44 and the arm 47 operate together on the well-known principle of the toggle-joint. Their operation may be understood by reference to Figs. 17, 18, and 19. Fig. 17 shows the toggle in one position with the free end of the stud 33 depressed and the disks 31 32 in contact, and Figs. 18 and 19 show the toggle in position to raise the free end of the stud 33, thereby separating the disks 31 32. The operation of this toggle is such that a very small force applied to the lever 44 is sufficient to raise the stud 33. I have provided the arm 47 with an antifriction-roller 48, which engages the rounded end of the arm 45 to reduce friction in the operation of the toggle.

49 is an oscillating shaft extending across the machine adjacent to the top of the pack of sheets and supported by bearings carried by the truss 4 and frame side 5. (See Figs. 1 and 27.)

50 50 are horizontally-projecting arms carried by the shaft 49 and carrying a roller 52, having its journals 52$^a$ mounted in bearings or bosses 51 in the arms 50. The roller 52 is adapted to rest upon the surface of the pack of sheets and to be supported thereby, and the weight of the roller is such that when it is unsupported it will descend and rock the shaft 49. The ends of the journals 52ª may extend beyond the bearings 51, and when the roller 52 descends to a certain extent the ends of its journals may rest upon projections 53, extending from the bearings of the shaft 49, thereby sustaining the roller 52 when not otherwise supported.

54 is an arm fixed on one end of the shaft 49 and having its outer end connected to the arm 46 of the lever 44 by a connecting-rod 55. The connection between the arm 54 and rod 55 may be effected through the medium of an end piece 56, pivoted to the end of the arm 54, Figs. 1 and 2, and receiving the threaded end of the rod 55, which may be provided with adjusting-nuts to adjust the rod and regulate the movement of the toggle which raises the stud 33, so as to adapt that movement to variations which may occur in the diameter of the disks 31 32.

When the roller 52 is supported in a lowered position by the projections 53, the parts will occupy the positions shown in Figs. 1 and 17, with the disks 31 32 in contact, as shown in Fig. 5, and the table-elevating devices will be operated to raise the table. When the roller 52 is lifted—as by the raising of the pack of sheets, for instance—into the position shown by dotted lines in Fig. 1, the shaft 49 and arm 54 are oscillated into the position shown by dotted lines 54ª 56ª, Fig. 1, and, through the medium of the rod 55, the lever 44 is also oscillated, and the toggle which oscillates the stud 33 is caused to assume the position shown in Fig. 19, thereby separating the disks 31 and 32 and throwing the table-elevating devices out of operation.

When a sufficient number of sheets have been withdrawn from the pack to permit the roller 52 to fall and, through the medium of the connecting parts described, release the toggle, the disks 31 32 are again forced into contact by the action of the spring 43, and the table-elevating devices will again be put in operation. By a repetition of these actions the top of the pack of sheets will be maintained at substantially the same level. The roller 52 turns freely in its bearings as the sheets are withdrawn and exerts but a slight retarding influence upon them.

For the purpose of lowering or at any time operating the pile-table by hand I employ a hand-wheel 57, fixed to the upper end of the vertical shaft 19, and a disengaging device to disconnect the shaft 19 from the control of the shaft 26 when it is to be operated by hand. The parts now to be described are more particularly shown in Figs. 5, 11, 12, 13, 14, and 15. The worm-wheel 29 is attached to the shaft 19 through the medium of a clutch connection with the hub of the hand-wheel 57. The wheel 29 is provided with an upwardly-extending hub or sleeve 58, which fits loosely on the shaft 19, extending through the bearing 21 and terminating in an enlargement or boss 59, provided with a shoulder engaging the upper end of the bearing 21. The boss 59 is provided with clutch-teeth 60, which engage clutch-teeth 62, formed on the lower end of the hub 61 of the hand-wheel 57. When the gear 29 is turned by the worm 30 and the clutch-teeth 60 62 are in engagement, the shaft 19 is rotated through the medium of the clutch connection described.

63 is a sleeve loosely surrounding the hub 61 of the hand-wheel 57 and a portion of the boss 59 outside of the clutch-teeth 60 and 62. The lower end of the sleeve 63 is provided with cam-teeth 64, which engage complementary teeth 65 on the boss 59. When the teeth 64 65 are in the position shown in Fig. 11, the clutch-teeth 60 62 will be in engagement, as shown in Fig. 14, and the shaft 19 will be under control of the shaft 26. When the sleeve 63 is turned in the direction of the arrow in Fig. 11, the cam-teeth 64 act on the oppositely-disposed teeth 65 with the effect of forcing the sleeve 63 upward into the position shown in Fig. 12. As the sleeve 63 moves upward its shoulder engages a shoulder formed on the hub 61 (see dotted lines, Fig. 11) and raises the hand-wheel 57 and lifts its teeth 62 from engagement with the teeth 60, as shown in Fig. 15. The shaft 19 will then be disengaged from the shaft 26, and while so disengaged may be turned by the hand-wheel 57 in either direction to lower or raise the pile-table. For operating the sleeve 63 it may be provided with handles, as shown. The ends of the teeth 64 when in position shown in Fig. 12 may fall into slight depressions formed on the upper ends of the teeth 65 to prevent accidental turning of the sleeve 63. When the sleeve 63 is raised, the shaft 19 is raised also and, at such times, the weight of the shaft rests, through the medium of the hand-wheel 57, sleeve 63, and boss 59, upon the upper shoulder of the bearing 21. The parts are returned to the position shown in Fig. 11 by turning the sleeve 63 in a direction opposite to that indicated by the arrow in that figure.

*The adjustable side gage.*—The side gage that adjusts the pack transversely consists of a series of vertical arms 66 66, &c., supported from a base 67, which may be moved and guided across the machine in guides or ways 68, which I have shown attached to a plate 69, resting upon the floor under the machine. The base 67 may be moved along its guides by means of screws 70 70, passing through threaded bosses 71 71, one at each end of the base-piece. (See Fig. 16.) The screws 70 70 may be held by bearings 72, carried by the floor-plate 69, and may be turned by a shaft 73, supported in bearings 75 and arranged at a right angle to the screws and operating them through the medium of bevel-gears 74 74, &c. For operating the shaft 73 I have shown it extended at one end through the front plate 1 and operatively connected with a hand-wheel 76. In order to elevate the hand-wheel 76 to a position convenient for operating it, I have shown it mounted upon a stud carried by the front plate 1 above the shaft 73 and connected with the shaft 73 by gears 77 78. (See Fig. 5.)

The vertical arms 66 extend through slots 79 in the table 16 (see Fig. 22) and may be adjusted transversely therein without interfering with the movement of the table. The portions of the table between the slots, which may be properly braced by underlying ribbing, furnish a sufficient support for the pack.

*Sheet individualizing and withdrawing mechanism.*—This mechanism consists of a pneumatic individualizing device, rotary separator-blades combined with an initial sheet-withdrawing roller, a withdrawing-drum, and a series of auxiliary withdrawing-rollers.

80 is the outer casing or shell of the pneumatic individualizer, supported by a bracket 81, carried by the front plate 1. (See Figs. 1, 4, and 5.)

The case 80 is provided with a nipple 82, to which is attached a connection to a suction-creating device, which may be of any now well-known construction. This device and the connections thereto are not shown in the drawings, as the details of such devices form no part of the present invention. By means of the suction-creating device a partial vacuum of the proper strength is at all times maintained in the chamber and passages within the casing 80.

82ª is the opening or hole through the nipple 82, leading into a vacuum-chamber 83, formed in the upper part of the casing 80. (See Fig. 37.)

84 is a hollow piston adapted to move vertically within the case 80, and it may be provided with packing-rings 85 85. The passage in the casing 80 in which the piston 84 moves is pneumatically connected at its upper end with the chamber 83. In the drawings this passage is shown opening at its upper end directly into the said chamber; but the passage may, if required in a modified construction of the apparatus, be connected to the chamber by a passage-way or tube of any required length. The piston 84 is caused to move within the case 80 by alternately creating and destroying a vacuum within the chamber 83 and above the piston 84. When a vacuum is created above the piston, it is forced inward by atmospheric pressure. When the vacuum is destroyed, the piston may descend by gravity or it may be forced outward by the action of a spring 86. I have shown this spring placed above the piston and partly within a cavity in its end with the upper end of the spring bearing against a portion of the fixed casing 80. A diaphragm 87 cuts off communication between the lower portion of the piston and the chamber 83.

The piston 84 in cross-section may have a circular shape and its hollow portion below the diaphragm 87 may be divided by a vertical wall 88 into two passage-ways 89 and 90. (See Fig. 51.)

The lower end of the piston 84 is expanded to form a small cylinder 91, within which is fitted a piston 92, adapted to move horizontally to and from the pack of sheets. The cylinder 91 and piston 84 are prevented from turning out of their proper alinement by lugs 93 on the cylinder engaging a projection 94, extending from the fixed casing 80.

The downward movement of the piston 84 and cylinder 91 may be limited by an adjustable stop 95, shown as a set-screw passing through a lug branching from the bracket 81. (See Figs. 1 and 5.)

96 is a packing-ring about the piston 92, and 97 is a vacuum-chamber in the rear of the piston. The piston 92 is caused to move within the cylinder 91 by alternately creating and destroying a vacuum within the chamber 97 behind the piston 92. When a vacuum is created in the chamber 97, the piston 92 is moved rearwardly by atmospheric pressure, and when the vacuum is released in the chamber 97 the piston 92 is forced forward by the action of a spring 98.

The forward movement of the piston 92 is limited by a stop 99, and the piston is prevented from turning in the cylinder 91 by a feather 100, carried by the piston and sliding in a groove 101, cut in the cylinder 91.

102 is a tube projecting from the end of the piston 92 and terminating in a nozzle 103, the mouth of which is turned toward the pack of sheets and is preferably inclined as shown. The nozzle of the tube 102 may be flared, as in Fig. 51, and the mouth of the nozzle may be divided by cross-webs, as at 104 in Fig. 52, so as to prevent a sheet from being drawn into the nozzle.

The tube 102 communicates with the passage-way 89 through the medium of a short passage or hole 107, formed through the side of the piston 92, and a passage-way 105, and the chamber 97 is connected to the passage-way 90 by a passage 106. The passages 105 and 106 may each be formed in the walls of the cylinder 91.

When the parts are in the position shown in Figs. 37 and 38, the tube 102 is in communication, through the hole 107 and passage 105, with the passage 89; but when the parts are in position shown in Fig. 39 the tube 102 is cut off from communication with the passage 89 by the inward movement of the piston 92, which has carried the hole 107 out of line with the passage 105.

108 is a spindle-valve fitted into the casing 80 and provided with two passages 109 and 110, passing transversely through it. (See Figs. 45 and 46.) The passages 109 and 110 are disposed at right angles to one another and in different positions longitudinally on the spindle 108, with a solid portion separating them from one another.

111 and 112 are short passages leading at right angles from the passages 109 and 110, respectively, laterally through the spindle. The arrangement of these passages relatively to each other may be understood by reference to Figs. 45, 47, and 48. By turning the spindle 108 through one-quarter of a revolution the passages in it may be made to assume the positions shown in Figs. 49 and 50.

113 is a passage leading from the chamber 83 to the valve 108 and is so arranged that either of the passages 109 or 110 may communicate with it.

114 is a passage-way at one end leading to the valve 108, adjacent to the passages 109 and 111 therein, so that it may communicate with either of them according to the way the valve 108 is turned, and at its other end leading to the passage-way 89, with which it communicates through an opening 115 in the walls of the piston 84.

116 is a passage-way at one end leading to the valve 108, adjacent to the passages 110 and 112 therein, so that it may communicate with either of them according to the way the valve 108 is turned, and at its other end leading to the passage-way 90, with which it communicates through an opening 117 in the walls of the piston 84.

The passage-ways 114 and 116 may be formed in the walls of the casing 80, one on either side of the piston 84, and these passage-ways may be bent or offset, as shown in Figs. 43 and 44, in order that their upper ends may contact at the proper places upon the valve 108.

The openings 115 and 117 through the walls of the piston 84 are extended in the direction of the length of the piston sufficiently to maintain communication between the passage-ways 89 and 90 and the passage-ways 114 and 116, respectively, throughout the entire movement of the piston.

118 and 119 are openings through the casing 80 to the valve 108 in position to communicate with the passages 109 and 111 and the passages 110 and 112, respectively.

The operation of the pneumatic individualizer is as follows: The individualizing device is so placed that the nozzle 103 may rest upon the top of the pack of sheets a short distance from its front edge, and suction through the nipple 82 is constant, tending to produce a vacuum in the chamber 83. When the valve 108 is in the position shown in Figs. 45, 46, 47, and 48, the chamber 97 in the rear of piston 92 will be in communication with the open air through the passages 106, 90, 117, 116, 110, and 119 and will be cut off from communication with the chamber 83. There will therefore be no vacuum behind the piston 92, and the spring 98 will maintain the piston 92, tube 102, and nozzle 103 in their outward positions with the hole 107 coincident with the passage 105. (See Fig. 37.) At the same time the nozzle 103 and tube 102 will be shut off from communication with the atmosphere through the opening 118, but will be in communication with the chamber 83 through the passages 107, 105, 89, 115, 114, 111, 109, and 113, and the suction created in the chamber 83 through the nipple 82 will extend to the nozzle 103, so that when the mouth of the nozzle is unobstructed air will pass through the nozzle to the chamber 83. The sectional area of the sucking-orifice of the nozzle 103 and of the passages leading therefrom and through the valve 108 is relatively larger than the sectional area of the opening 82ª through the nipple 82, so that air may pass with less frictional resistance into the chamber 83 through the nozzle 103 than it can pass outwardly from the chamber through the nipple 82. Consequently whenever air is supplied to the chamber 83 through the nozzle 103 no vacuum can be created in the chamber 83 and the piston 84 will assume the lowered position shown in Figs. 31 and 37, in which position the nozzle 103 may rest upon the sheets in the pack.

When the nozzle 103 rests upon the pack, the suction through the nozzle will draw the edge of the outermost sheet against the open end of the nozzle, thus closing it and permitting the suction in the chamber 83 to form a partial vacuum above the piston 84, thereby raising the piston and with it the tube 102 and nozzle 103 into the position shown in Figs. 32 and 38. As the nozzle 103 rises it takes with it the portion of the sheet which adheres to and lies adjacent to it, thereby separating that portion of the sheet from other sheets in the pack. After the mechanism which is to further separate the sheet from the pack is brought to act upon it the valve 108 is turned into the position shown in Figs. 49 and 50, and when the valve is in this position the nozzle 103 is shut off from communication with the chamber 83 and is placed in communication with the atmosphere through the passages 107, 105, 89, 115, 114, 109, and 118, thereby destroying the vacuum in the nozzle and releasing the sheet from it. At the same instant the chamber 97 is shut off from communication with the atmosphere and is put into communication with the chamber 83 through the passages 106, 90, 117, 116, 112, 110, and 113. The partial vacuum in the chamber 83 then extends into the chamber 97 behind the piston 92 and draws the piston inward, as shown in Figs. 33 and 39, thereby withdrawing the nozzle 103 from over the edge of the pack. During this action the piston 84 continues in a raised position because the vacuum is maintained above it. After the edge of the individualized sheet has been carried by mechanism hereinafter described beyond the line of movement of the nozzle 103 the valve 108 is returned into the position shown in Figs. 47 and 48, and when the valve is in this position the nozzle 103 and tube 102 are again placed in communication with the chamber 83 through the passages 107, 105, 89, 115, 114, 111, 109, and 113 and the chamber 97 is again brought into communication with the open air through the passages 106, 90, 117, 116, 110, and 119 and the vacuum behind the piston 92 is destroyed, so that the piston and tube 102 are moved outwardly by the action of the spring 98. Until the piston 92 is thus moved outwardly the piston 84 remains elevated by the maintenance of the vacuum in the chamber 83 above it. When, however, the piston 92 is moved forward in the manner described, the opening 107 is brought in line with the passage 105 and air rushes into the chamber 83 through the nozzle 103, destroying the vacuum in the chamber and permitting the piston 84 with the tube 102 and nozzle 103 to be lowered again into the position shown in Figs. 31 and 37. The nozzle is then in position to act on another sheet and the operations described are repeated.

I will now describe the means which I employ to turn the valve 108.

120 is a segmental gear on the stem of the valve, which meshes with a segmental rack 121 on a rocking arm pivoted to the casing 80. (See Fig. 1.) Attached to the arm 121 is an arm 122, the outer end of which is operated by a cam 123, carried by a shaft 124, supported at one end by a bearing formed in the casing 80 and at its other end by a bearing 125, carried by the front plate 1, as by the bracket 42. (See Figs. 3, 4, and 5.) The cam 123 may operate on the arm 122 through the medium of an antifriction-roller 126, carried by the arm. A spring 127 between the arm 121 and a stationary part tends to move the arm against the action of the cam 123. The cam 123 and spring 127 rock the arm 122 and segment 121, operating the segment 120 and turning the valve 108 in the manner described.

128 is a cylinder or drum mounted in bearings carried by the frame of the machine and arranged transversely over and adjacent to the pack of sheets, near that edge of the pack upon which the individualizing device acts, and this drum is adapted to withdraw sheets from the pack when they are pressed against it.

The drum 128 may be constructed in any well-known manner and may be provided with a smooth external surface covered with proper frictional material to act upon the sheets; but when the sheets are being fed which have been printed or otherwise acted upon the smooth surface sometimes causes the sheets to be blurred or marked by contact with it. To avoid this, I have shown a drum constructed to act only upon the blank marginal edges of the sheets. This drum is provided with frictional disks 129 129 and with means to prevent those portions of the sheets lying between the disks from sagging as the sheets pass over the drum. (See Figs. 56 and 57.) The disks 129 may be adjusted to adapt them to sheets of different widths or in different positions relatively to the medial line of the machine.

130 is a hollow shaft extending the whole length of the drum 128, and in this shaft is cut a slot 131, extending longitudinally from one end of the shaft nearly to the other end of it. The disks 129 are mounted on the shaft 130 so as to turn with it, while free to slide longitudinally thereon.

132 132 are disks fixed to the shaft 130, one near each end thereof, and these disks are connected by a series of horizontal rods 133, arranged at small intervals around the periphery of the disks, Fig. 1. The rods 133 form a cylindrical support slightly less in diameter than the disks 129, so that when the sheets pass over the drum they rest lightly upon the rods and are supported thereby and prevented from falling between the disks.

134 is an intermediate disk on the shaft 130 to support the rods 133 in the middle of their length. The rods 133 pass loosely through holes in the disks 129, so that these disks, when they are adjusted, will not be impeded by the rods. The frictional surfaces of the disks 129 may be formed by rubber bands 135.

136 136 are two threaded rods, which pass, one from each end, inward through the hollow shaft 130 and may be held in position by bearings 137, fixed in the ends of the hollow shaft, and by a bearing 138 in the middle of the shaft. The bearing 138 may be secured by a rib extending through the slot 131 and secured to the hub of the fixed disk 134. Shoulders 139, formed on the rods 136, may thrust against the bearings 137, and the rods may be turned by hand-wheels 140 140, fixed one on the end of each rod.

141 are threaded nuts within the shaft 130 and connected to the disks 129 by ribs extending through the slot 131 and secured to the hubs of the disks. These nuts 141 may move freely through the hollow shaft, and when moved will move the disks 129 with them. The threaded rods 136 extend through the nuts 141, and when turned will move the nuts and adjust the disks longitudinally on the shaft 130.

The hand-wheels 140 are fixed to their respective rods each by a key, so that while the hand-wheels may turn the rods they may move slightly lengthwise thereon. Upon the outer ends of the rods 136 and outside of the hand-wheels 140 are placed lock-nuts 142 for locking the rods against movement after they have been operated. A nut 142 operates to lock a rod 136 by forming a bind between the shoulder 139 on the rod and the hub of a hand-wheel 140 against a bearing 137 when the nut is screwed against the outer end of the hub of the wheel.

By the arrangement described each disk 129 may be adjusted independently of the other, so that the disks may be placed over the margins of packs irregularly placed as to the medial line of the machine; but in machines where the margins of the packs are always disposed at equal distances each side of the medial line of the machine the two screw-rods 136 may be replaced by a single screw-rod having a right-handed thread for the nut of one of the disks 129 and a left-handed thread for the nut of the other disk 129.

With such a rod the disks 129 would be moved equally in opposite directions and would be adjusted to the margins of different widths of packs when such margins were equally disposed, as described.

143 is the initial sheet-withdrawing roller or cylinder located adjacent to, parallel with, and nearly vertically over the front edge of the pack of sheets and between the withdrawing-drum 128 and the individualizing device. The body of the roller 143 may be attached to head-pieces 144, provided with journals 145, and the body part, heads 144, and journals 145 may, if desired, be all in one piece. (See Figs. 53, 54, and 55.) The said body part and the devices carried thereby have a constant rotation in the direction indicated by the arrow in Fig. 1.

The body of the roller 143 is reduced for a short distance at about the middle of its length, as at 146, so as to divide the exterior portion of the body into two portions and form a space, (marked 147 in Figs. 4 and 5,) within which the nozzle 103 of the individualizing device operates.

148 and 148$^a$ are similar frictional pads carried by the roller 143, one on each side of the space 147 and extending circumferentially over a portion of its periphery. These pads are preferably formed of rubber and may be fixed to the roller by being embedded in grooves cut therein. The pads 148 and 148$^a$ project beyond the peripheries of the other portions of the roller, and each extends from the space 147 across the machine to a point vertically over the side edge of the widest sheets which the machine is adapted to feed, and each is adapted to make contact with the drum 128 throughout its entire length. The body of the roller 143 opposite the pads 148 148$^a$ is cut away to form a longitudinal recess to receive the edge of a sheet during a portion of each revolution of the roller.

149 and 149$^a$ are blades carried by the roller 143, (as by the projections 150 150$^a$ thereof,) bent concentrically to the axis of the roller and extending forward from the frictional pads 148 148$^a$ over a part of the longitudinal recess in the body of the roller. The blades 149 149$^a$ assist in separating the sheets from the pack and are referred to hereinafter as the "separator-blades." The blades 149 and 149$^a$ may be of the same length as the corresponding pads 148 and 148$^a$ and may be placed opposite them, as shown. The edges of the blades 149 and 149$^a$ slant spirally with respect to the axis of the roller 143, and the projections 150 and 150$^a$, upon which the blades are secured, may slant correspondingly, as indicated by dotted lines in Fig. 54.

As may readily be seen by reference to Fig. 54, one end of the slanting edge of each separator-blade is more advanced in the direction in which the roller turns than the other end of the edge, and this advanced end may be conveniently referred to as the "advanced" portion, while the other end may be referred to as the "lower" portion of the edge of a blade. The separator-blades are arranged each with its advanced portion adjacent to the central cut-away space 147. The ends of the body of the roller 143 may be extended rearwardly, as at 151 and 151$^a$, opposite the lower portions of the blades to strengthen the roller and compensate for the material removed to form the slanting portions 150 and 150$^a$.

The journals 145 of the roller 143 are supported in bearings 152, adapted to slide in grooved ways in the frame of the machine in the direction of the drum 128. The bearings 152 are pressed toward the drum 128 by springs 153 and are adjusted by set-screws 154. (See Fig. 2.) The stops 154 regulate the pressure of the pads 148 148$^a$ of the roller 143 against the drum 128, and also serve to maintain the position of the roller 143 when its pads are turned away from the drum.

To insure the separation of but a single sheet at a time from the pack by the action of the nozzle 103, I provide lips or guards 155 155$^a$, preferably double-pointed, as shown, which overlie the edges of the sheets, one lip on each side of and adjacent to the nozzle. (See Figs. 1, 6, and 32.) When double-pointed lips are employed, the upper points can be placed only in the space 147 in the middle of the roller 143, where they will not interfere with the action of the separator-blades 149 and 149$^a$. The lower points of the lips, however, may extend along the edge of the sheet as far as desired, as these lips are not high enough to interfere with the separator-blades. The lips 155 155$^a$ are shown carried by clips 156 156$^a$, secured to the front plate 1.

157 and 158 are rollers located adjacent to the drum 128, both adapted to make contact with the drum to assist in withdrawing the sheets and preferably supported in spring-pressed bearings in slideways formed in the frame of the machine. The roller 157 may be placed adjacent to the roller 143, but without making contact therewith.

159 is a guide-plate adapted to direct the forward edges of the sheets from the roller 157 to the roller 158, and it may be supported by brackets 160 from the frame of the machine.

The surfaces of both of the rollers 157 158 may be continuous, and the surface of the roller 157 is so shown in the drawings, but I sometimes construct these rollers with adjustable frictional disks similar to the disks of the drum 128, and I have shown this construction in the roller 158, which is provided with a threaded shaft 161, carrying the adjustable threaded disks 162, adapted to be adjusted longitudinally on the shaft when rotated thereon and to be held in place by lock-nuts 163 when adjusted.

When the machine is not in operation, the pressure of the several rollers described against the drum 128 tends to produce indentations in the suface of the drum, which finally become permanent and impair the operative effectiveness of the drum. To avoid this defect in the case of the roller 143, that roller is so turned that its frictional pads will be out of contact with the drum, as shown in Fig. 24, and in the case of the rollers 157 and 158 means are provided to raise the rollers from the drum when the machine is at rest.

Reference will now be made particularly to Figs. 1, 2, 24, 25, and 26. Upon each of the bearings of the rollers 157 158, preferably upon its inner end, is placed a loose collar 164, provided with a lever-handle 165, having a projection 167, extending over a fixed cam 166, supported by the frame of the machine and forming, if desired, a portion of the cap-piece over the bearing of the roller, as shown. The exterior edge of each cam 166 is curved about the roller which it surmounts, with one end nearer the center of the roller than the other, and these curved edges of the cams may slope in the directions shown. Each handle 165 may be so moved that its projection 167 will travel in the arc of a circle concentric to the center of the roller which it surmounts, and the projection 167 on each handle is so placed with reference to the edge of the adjacent cam that when the handles are in the position shown in Figs. 1 and 2 the projections 167 will be out of contact with the adjacent edges of the cams, and consequently the rollers 157 158 may make contact with the drum 128. When, however, the handles are turned to the position shown in Figs. 24 and 25, the projections 167 ride up over the high parts of the cams 166 and lift, through the medium of the handles 165 and collars 164, the bearings of the rollers in their slideways, thereby raising the rollers 157 158 away from the drum. When the handles 165 are returned again to the positions shown in Figs. 1 and 2, the rollers 157 158 may again rest against the drum 128. Clips 168, secured to the projections 167, may pass behind the cams to retain the handles laterally.

I will now explain the operation of the parts described in individualizing and withdrawing sheets. After the side gage has been adjusted so that its vertical arms 66 66 occupy a position to adjust the pack of sheets transversely with respect to the medial line of the machine a pack of sheets is placed upon the table 16, with the front of the pack against the front plate 1 and a side of the pack against the arms 66 66. If necessary, the top of the pack is brought to the proper level by means of the hand-wheel 57 through the medium of the mechanism described. The sleeve 63 is then turned to put the vertical shaft 19 into driving connection with the shaft 26, and gears 37 38 of the proper size to give to the table-elevating mechanism a speed suited to the thickness of sheets in the pack are placed in position. If the withdrawing-drum and rollers 157 158 have adjustable disks, the disks 129 of the drum are adjusted to positions over the side margins of the sheets in the pack and are locked by the clamping-nuts 142, and the disks 162 are correspondingly adjusted to make contact with the disks 129 and secured by the check-nuts 163. The handles 165 are turned to bring the rollers 157 158 into contact with the drum. The several rollers described are driven at such speed that the surfaces of the drum 128, rollers 157 and 158, and the surfaces of the frictional pads of the roller 143, when in contact with the drum 128, have the same speed.

Figure 6:
Figures 8, 9:
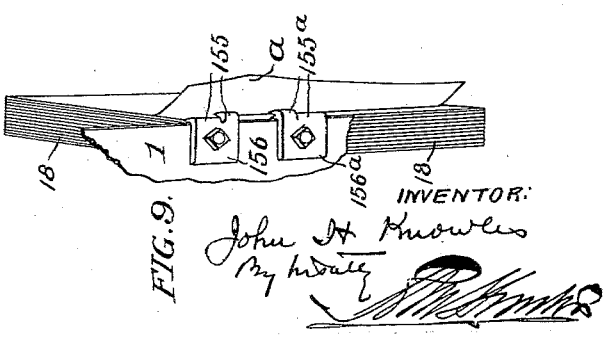

Supposing the parts are in the positions shown in Figs. 31, 37, 41, 47, and 48, with the nozzle 103 resting on the pack and the cam 123 occupying the positions shown by full lines in Fig. 41, the process of withdrawing sheets will be as follows: The suction created in the chamber 83, through the nipple 82, extends through the nozzle 103, and a sheet is sucked against the mouth of the nozzle, whereupon the nozzle rises in the manner previously described and lifts that portion of the sheet which adheres to it by reason of the suction into the position shown by the line $a$ in Fig. 32, and in so doing scrapes the edge of the sheet over the lips 155 155$^a$, so that if two sheets have, by accident, adhered to the nozzle the lowermost sheet will be divided from the other by the scraping action. Fig. 6 shows the position of the edge of the sheet $a$ when thus raised by the nozzle. When a portion of the sheet $a$ is thus lifted, the roller 143 occupies such a position that the high portion of its separator-blade is adjacent to and below the level of the lifted edge of the sheet ready to pass under it, as shown in Fig. 32. When parts are in the position shown in Fig. 32, certain other parts not shown in that figure will occupy the positions shown in Figs. 38, 47, 48, and 1, with the cam 123 in the position shown in Fig. 1. As the roller 143 turns, the higher portions of its blades first enter into the space under the edge of the sheet $a$, where it is lifted by the nozzle. Notwithstanding that, as shown in Fig. 6, the ends of the front edge of the sheet $a$ may still rest upon the pack. This action is possible, because the lower portions of the blades slant rearwardly and permit the higher portions to first cross the line of the front edges of the sheets. As the roller 143 continues to rotate the slanting blades pass gradually under the sheet from the nozzle out toward the sides of the sheet and entirely separate the edge of the sheet from the pack. When the separator-blades have passed sufficiently far under the edge of the sheet to support it, the suction in the nozzle is broken and the nozzle is retracted from over the sheets in the manner heretofore described. The parts are then in the position shown in Fig. 33, and certain other parts not shown in that figure occupy the positions shown in Figs. 39, 42, 49, and 50, with the cam 123 in the position shown by full lines in Fig. 42. As the roller 143 further rotates its blades pass still farther under the sheet $a$ and partly raise it from the pack, with its lifted edge extending into the longitudinal recess in the roller, as shown in Fig. 34. During this movement of the roller 143 no change has taken place in the position of the nozzle 103. Figs. 7, 8, and 9 show the position occupied by the edge of the sheet $a$ when thus partly bent upward. Since the individualizer and the roller 143 occupy fixed positions in respect to the width of the machine, with the advanced portions of the separator-blades moving adjacent to the nozzle of the individualizer, while the pack of sheets may occupy various positions across the machine, the nozzle 103 may sometimes operate upon a pack of sheets in the middle of its width and sometimes nearer one side of the pack than the other; but it is immaterial in what position the pack may be placed laterally or what point across the front of a sheet may be brought under the nozzle. Fig. 7 shows a wide sheet, on which the nozzle 103 has operated in the center of its width, and Figs. 8 and 9 show narrower sheets, on which the nozzle has operated near a side edge. As the roller 143 continues to turn its separator-blades raise the entire front edge of the sheet $a$ and bend it about the withdrawing-drum, as shown in Fig. 35. During this movement the nozzle 103 still remains in the position shown in Figs. 33 and 34; but the cam 123 is turned into the position shown by dotted lines in Fig. 42. As the roller 143 turns into the position shown in Fig. 36 no action takes place upon the sheet $a$; but the nozzle 103 is projected again over the edge of the pack and certain parts not shown in Fig. 36 come into the positions shown in Figs. 38, 41, 47, and 48, with the cam 123 in the position shown by dotted lines in Fig. 41. The further movement of the roller 143 returns it into the position shown in Fig. 31, with the forward edges of the frictional pads 148 pressing the edge of the sheet $a$ against the drum. During this movement of the roller 143 the nozzle 103 falls upon the next sheet below the sheet $a$, ready to operate upon it. As the roller 143 continues turning its frictional pads 148 act upon the sheet $a$ and, in conjunction with the drum 128, commences the withdrawal of the sheet from the pack, and continues the withdrawal until the position shown in Fig. 32 is reached, when the pads will have acted for their entire width upon the sheet, thereby withdrawing it a distance equal to the width of the pads. As the sheet (marked $a'$ in Fig. 32) is thus withdrawn its forward edge will pass between the roller 157 and the drum 128. During this action on the first sheet a second sheet $a$ has been raised by the nozzle 103 in the manner described. As the edge of the sheet $a'$ passes between the roller 157 and the drum 128 its withdrawal is continued by the action of the roller against the drum, and its forward edge is directed by the curved guide-plate 159 under the roller 158, as shown in Fig. 35. Meanwhile the second sheet $a$ has been bent about the withdrawing-drum. By the continued action of the rollers 157 and 158 the sheet $a'$ is completely withdrawn from the pack. The second sheet $a$ will pass from the position shown in Fig. 35 through the several stages described in connection with sheet $a'$ and will also be withdrawn from the pack, and by the continued operation of the mechanism described a series of sheets will be successively individualized and withdrawn.

By the action described one sheet is separated from the pack with each revolution of the roller 143, and the withdrawal of each sheet may be commenced before the sheet previously operated upon has been completely withdrawn. When this is done, the forward edge of each succeeding sheet is bent over the preceding sheet, which yet lies upon the withdrawing-drum, and the two sheets are thereafter drawn simultaneously from the pack. If the sheets are very long, more than two sheets may thus be in process of withdrawal at one time.

Instead of reciprocating the nozzle 103 by the pneumatic devices shown, there may be substituted for the pneumatic devices any proper mechanical combination of levers and cams.

It is not essential for the operation of my individualizing and withdrawing devices that the pack of sheets be arranged horizontally, as here shown, but the pack may be held in an inclined position, as shown, for instance, in my Letters Patent No. 535,380, dated March 12, 1895.

In Figs. 76 to 80 I have shown a modification of my individualizing device adapted to positions where the corners only of sheets are to be acted upon. In this modified device the mechanism which reciprocates the suction-nozzle horizontally is omitted. The piston 84 has but one internal passage-way instead of two. The suction-tube 102 is fixed into the cylinder 91, forming the lower end of the piston 84, and the inner end of the tube communicates directly with the passage 105. The valve-spindle 108 has but one set of passages through it. The passage 114 and opening 115 have been placed on the left instead of the right hand side of the casing 80, and the position of the opening 118 has been changed correspondingly. When the parts are in the position shown in Fig. 76, the nozzle 103 may rest on the corner of the pack of sheets. The corner of the uppermost sheet is drawn by the suction in the nozzle against and closes the mouth of the nozzle, thereby permitting a partial vacuum to be formed in the chamber 83 and the piston 84 and tube 102 and the corner of the sheet sucked upon to be raised in the manner described. Fig. 79 shows the corner of the sheet $a$ thus raised. When this modified form of the individualizing device is used, a roller 143 is employed having but a single separator-blade—for instance, such as shown on the similar roller in the device described in my Letters Patent No. 544,764, dated August 20, 1895. As soon as the separator-blade has passed under the edge of the sheet and supports it the valve 108 turns into the position shown in Fig. 78, and both the nozzle 103 and chamber 83 are thrown into communication with the atmosphere through the opening 118. Suction ceases in the nozzle 103, which releases the sheet $a$, and at the same time the vacuum in the chamber 83 is destroyed, the piston 84 descends, and the nozzle 103 rests upon the second sheet of the pack, the parts being so timed that the nozzle 103 falls while the separator-blade is bending forward the edge of the sheet. When the nozzle 103 is falling, the corner of the sheet $a$, being pushed upward by the corner of the separator-blade 149, will first assume the position shown by full lines in Fig. 80, being bent downward just beyond the end of the blade; but before the nozzle has fully reached the surface of the pack the corner of the sheet will slip out from under the nozzle and will spring outward into the position indicated by dotted lines $a'$ in Fig. 80. As soon as the valve 108 is returned to the position shown in Fig. 76 a second sheet is individualized.

*Edge presser on rear of sheets.*—Sometimes the rear edges of two or more sheets in the pack will adhere to one another, and when this occurs and the topmost sheet is withdrawn the rear edge of the underlying sheet is liable to be rolled forward, being drawn along by the moving top sheet, and so disarranging the pack. To prevent this and to assist in maintaining the alinement of the pack, I provide a presser to act on the rear edge of the pack. I have shown the pressing instrument as a blade extending across the machine and pressing upon the entire rear edge of the pack in whatever lateral position it may be located, and I provide means to move the presser longitudinally to bring it over the rear edge of packs of varying lengths.

169 is the blade of the rear edge presser supported by bosses 170, which are mounted loosely upon a shaft 171, extending across the machine a short distance above the level of the top of the pack of sheets. In Figs. 1 and 58 the blade 169 is shown in the position which it occupies when acting upon the rear edge of a pack. 172 is a shaft arranged near and parallel to the shaft 171.

173 173$^a$ are carriages carrying, respectively, bearings 174 174$^a$, supporting the shaft 171, and 175 175$^a$ supporting the shaft 172. (See Figs. 28 and 29.) The carriage 173 is suspended by a lip 176 thereon from a flange 177 on the truss 4, and the carriage 173$^a$ is supported by a flange 178, formed on a rail 179, extending longitudinally along the frame side 5, to which it is secured. The carriages 173 173$^a$ may move freely along the flanges which support them.

180 is a rack secured to and extending along the under side of the flange 177, and 180$^a$ is a like rack secured to the under side of a flange 181, formed along the upper edge of the rail 179. The carriages 173 173$^a$ move under the racks 180 180$^a$.

182 182$^a$ are pinions fixed, one near each end of the shaft 172, in proper position to mesh with the gear-racks 180 180$^a$, respectively.

183 is a gear on the shaft 172 adjacent to the pinion 182.

184 is a hand-wheel mounted loosely upon an end of the shaft 171, carrying a gear 185, meshing with the gear 183. When the hand-wheel 184 is turned, the shaft 172 is turned also through the medium of the gears 185 183, and the pinions 182 182$^a$ are moved along the fixed racks 180 180$^a$, thereby moving the carriages 173 173$^a$ along the flanges 177 178 and adjusting the blade 169 relatively to the rear edge of the pack of sheets. When the blade 169 has been adjusted in this manner, the carriages are locked against further movement by a clamping-strap 186, pivoted to the carriage 173 (see Fig. 60) and passing around the shaft 172, or, as shown, around the hub 183$^a$ of the gear 183, and clamped by a clamping-screw 187.

188 188 are springs between the bosses 170 and the shaft 171, which act to press the blade 169 upon the sheets with a spring-pressure. The shaft 171 is prevented from turning in its bearings by a key 189, (see Figs. 40 and 60,) which fits a socket 189$^a$ in the carriage 173 and locks the shaft to the carriage.

The key 189 may be carried by a rod 190, extending through the end of the shaft 171, by which it may be moved longitudinally in a slot in the shaft 171 out of the socket 189$^a$ to release the shaft. The rod 190 may be provided with a button 191, if desired, by which it may be moved. The hand-wheel 184 and attached gear 185 have liberty of slight longitudinal movement on the shaft 171, so that the gear may be moved out of mesh with the gear 183, as shown in Fig. 40, and when the gear 185 is so moved the key 189 may be drawn into a socket in the hub of the hand-wheel or in the hub of the gear 185, as shown by full lines in Fig. 40, thereby locking the hand-wheel to the shaft 171 and permitting the shaft to be turned by the hand-wheel.

Fixed on the shaft 171 adjacent to the bosses 170 are collars 192, each having a projection 193, adapted to engage the under side of the blade 169, or, as shown, the bosses 170, to which the blade is attached, so that when the shaft 171 is turned in the manner described and in the direction indicated by the arrow in Fig. 58 the blade 169 will be raised from the pack, as shown in Fig. 59. The upward movement of the blade 169 may be limited by stops 194, which are carried by the bosses 170 and strike the shaft 172. The blade 169 may be locked in the elevated position shown in Fig. 59 by pushing the key 189 into a socket 195, Fig. 60, in the carriage 173. The blade 169 is thus raised when a fresh pack of sheets is to be supplied to the table or at other times.

The return movement of the shaft 171 may be limited by stops 196 on the collars 192, adapted to strike the shaft 172.

The key 189, instead of occupying sockets cut into the body of the carriage 173, may occupy sockets cut in a collar 197, (see Figs. 40 and 60,) surrounding the shaft 171 and set into a round hole in the end of the carriage 173. When the collar 197 is secured to the carriage 173, as by a set-screw 198, the key-sockets in the collar retain the shaft 171 precisely the same as if the key-sockets were cut into the substance of the carriage.

To adjust the tension of the coiled springs 188, the hand-wheel 184 is moved into the position shown in Fig. 40, with the key 189 in the position shown by dotted lines, partly in the hub of the hand-wheel and partly in the collar 197, the collars 192 are loosened on the shaft 171, and the collar 197 is loosened from the carriage 173. The shaft 171, with the collar 197, which is locked to it by the key 189, may then be turned either to the right or left. If the shaft be turned to the left, as indicated by the arrow in Fig. 58, the tension of the spring 188 will be slackened. If turned to the right, the tension of the spring will be increased. When the shaft 171 is turned to adjust the springs, the blade 169 may rest upon the pack of sheets. When the proper tension has been given to the springs, the collar 197 is again locked to the carriage 173 and the collars 192 secured in proper position on the shaft 171, whereupon all of the parts will be in position to perform the several functions described.

Instead of employing one hand-wheel 184 to turn both shafts 172 and 171 in the manner described, a hand-wheel may be fixed on the end of shaft 172 to turn that shaft, and a second hand wheel or crank may be fixed on the shaft 171 to turn that shaft. In this event the gears 183 185 would not be required.

*The sheet-registering mechanism.*—After the sheets have been withdrawn from the pack and have passed over the drum 128 they are received upon a sheet-conveyer, shown in the drawings as a series of rollers 199, extending rearwardly from the drum and having their top surfaces in a plane substantially horizontal with the top of the drum. The rollers 199, which turn in the direction shown by arrows, are provided with proper frictional surfaces and are supported by bearings carried by the machine-frame.

Should any of the sheets be out of proper alinement when they are received upon the conveyer, it is necessary to restore them to their proper position before they are further operated upon. The mechanism which I employ for this purpose consists, in conjunction with the conveyer, of front stops to temporarily stop the sheets to permit them to be registered, a side gage, and devices for moving the sheets laterally against the side gage.

As the withdrawing mechanism may operate to commence the withdrawal of a second sheet before the previous one has been fully withdrawn, and to place the edge of the second sheet over the previous sheet, it is apparent that when the sheets reach the conveyer they may lie in a series, with the foremost sheet next to the conveyer and with the forward edge of each sheet more or less in advance of the next following sheet.

For the proper operation of my registering device the conveyer should be of sufficient length to permit the longest sheet which is to be fed by the machine to lie free upon it, and as subsequent sheets overlie the foremost sheet on the conveyer it is necessary that the free sheet shall be operated on to move it against the side gage by an instrument which makes contact with the under side of the sheet.

The front stop may be of any proper construction and may be operated in any convenient manner. The stop marked 285, which I prefer to employ, is a part of the final spacing out and separating devices and will be particularly described when I describe those devices. This stop reciprocates and at one period of its reciprocation passes across the pathway of the sheets, so that each sheet is temporarily arrested in its forward movement. During the temporary stopping of each sheet the side registering of the sheet is accomplished, after which the front stop moves out of the way and the sheet passes forward.

The distance between the forward edges of successive sheets, as related to the surface speed of the carrier, is such that after the bottom sheet is arrested and before the next overlying sheet can reach the front stop sufficient time will elapse to permit the lower sheet to be registered to allow the front stop to move away and permit the forward edge of the registered sheet to pass and to allow the stop to return to intercept the next sheet.

The devices which I employ to move the sheets into proper alinement consist of a series of frictional pads, which operate upon the under surface of a sheet and draw it against a series of side-gage fingers. The gage-fingers and the frictional pads and their operating mechanism are mounted on a bar or frame, which is adjustable transversely across the machine to adapt the registering devices to sheets of different widths or in different positions. By this means the registering devices may be adjusted without altering the relative adjustment of the frictional pads and gage-fingers.

200 200 are cross-bars, preferably of the cross-section shown in Fig. 1, supported by the sides of the machine-frame and extending transversely across the machine below the conveyer and located each partly between a pair of adjacent rollers 199. While I have shown two bars, there may be more than two, if desired.

201 is a longitudinal bar or frame, preferably of the cross-section shown in Figs. 62 and 63, mounted on the cross-bars 200 and movable thereon. The bar 201 may be supported from the cross-bars 200 by standards 202, preferably made thin in the direction of the length of the cross-bars 200, so as to pass between adjacent rollers 199, and terminating in shoe-pieces 203, adapted to grasp the cross-bars 200 and slide thereon. (See Figs. 1 and 30.)

In order to adjust the bar 201 and the parts carried thereby transversely more accurately and easily than the same can be done by hand, I provide adjusting-screws 204 204, each threaded through a boss 205 on the side of a shoe-piece 203 and supported at one end by a bearing carried by the truss 4 and in the middle by a bearing 206, carried by a cross-bar 200. (See Fig. 4.) Each screw 204 may be operated by a hand-wheel 207 on its end, and the screws may be connected together by sprockets 208 and an endless chain 209, so that when either screw 204 is turned the other screw 204 will turn correspondingly.

210 is a shaft supported in bearings carried by the machine-frame and extending transversely over the conveyer.

211 is a shaft parallel to the longitudinal bar 201 and supported by bearings therefrom.

212 is a bevel-gear mounted on the shaft 210 so as to be free to move longitudinally thereon while rotating with it, and may be so mounted by a key fixed in the hub of the gear and sliding in the keyway 214, cut along the shaft.

213 is a bevel-gear fixed on an end of the shaft 211 and engaging the gear 212.

215 is a bearing carried by the bar 201 and encircling the hub of the gear 212 between shoulders 216 thereon. (See Fig. 4.) When the bar 201 is moved across the machine, the gear 212 is moved on the shaft 210 through the medium of the bearing 215, and the gear 213 will be driven from the gear 212 in whatever position the bar 201 may be adjusted.

217 is a shaft parallel to the shaft 211 and also supported by bearings carried by the bar 201. As it is desirable that the shaft 217 shall make a series of rapid revolutions with an interval of rest between one revolution and another, it is driven from the constantly-moving shaft 211 by a form of escapement motion.

218 is a disk fixed on the shaft 211 and provided with a notch or recess 219 in its edge. (See Fig. 30.)

220 is a gear mounted loosely upon the shaft 211, but connected thereto by a spring 221, Fig. 3, attached at one end to the gear 220 and at the other end to the shaft 211, or to a collar fixed thereon, and tending to rotate the gear under the driving action of the shaft 211.

222 is a gear fixed on the shaft 217 and engaging the gear 220. Upon a side of the gear 222 is a stud carrying a rubber-covered anti-friction-roller 223, adapted to make contact with the edge of the disk 218 and roll thereon.

When the parts are in the position shown in Fig. 66, with the roller 223 against the disk 218, the gears 220 and 222 tend to turn in the direction of the arrow under the driving action of the spring 221. Rotation is prevented, however, by the disk 218, which intercepts the path followed by the roller 223, and the gears 220 and 222, with the shaft 217, will remain at rest, while the rotation of the shaft 211 winds up the spring 221. This action will continue until the disk 218 reaches the position shown in Fig. 30. As the disk 218 turns from the position in Fig. 30 its notch 219 comes opposite the roller 223. The roller then enters the notch, as shown in Fig. 65, being moved forward by the turning of the gear 222 under the action of the spring 221, and as the disk 218 continues to rotate the notch 219 is advanced until the roller 223 escapes from the notch, so that the gears 222 and 220 will be free to turn, whereupon these gears and the shaft 217 will be turned rapidly by the recoil of the spring 221, acting first upon the gear 220 and thence transmitting motion to the shaft 217, through the medium of the gear 222 thereon, until the roller 223 again comes into contact with and rests upon the disk 218, which it may do by the time the disk has turned to bring its notch 219 into the position shown in Fig. 66. As the spring 221 recoils and turns the gear 220 it will unwind to the same extent that it was wound up by the previous action. The shaft 217 is caused to make one complete revolution with each sheet operated on by the registering mechanism.

224 is a bar parallel to the bar 201 and supported therefrom, as by the bracket-bearings which support the shaft 217.

225 are the side-gage fingers carried by the bar 224, one of which may project into each space between adjacent rollers 199 and one into the space beyond the final roller 199. The fingers 225 have their ends extending below the level of the sheets upon the conveyer and move in the said spaces when the bar 201 is moved transversely.

226 are brackets extending from the bar 224 over the edge of the sheet to be registered, as in Fig. 62, in which figure *a* represents a sheet supported by the conveyer in a position which it may occupy before it is registered. I have shown four brackets 226, (see Fig. 1,) but this number is not essential.

227 are the registering-pads carried by the finger-bars 228, one of which is located below each bracket 226. Normally the pads remain suspended below the side edge of the sheets a short distance from the gage-fingers 225, and the finger-bars 228 are moved to raise the pads under the edge of a sheet, to move them laterally to draw the sheet against the gage-fingers and then to cause them to descend to their normal positions and there remain at rest until they are again operated. Each registering-pad when it rises under a sheet presses it against a bracket 226, and thereby obtains the necessary frictional hold on the sheet to move it. Such brackets as may overlie two or more sheets may be faced with frictional material to hold the uppermost sheet while the lowermost sheet slips under it, but the faces of such brackets as overlie but a single sheet should be smooth to allow the sheet to slip easily under them.

The pads 227 are so operated that the stroke by which they move the sheets sidewise has a definite length, but the sheets to be registered may lie with their edges at varying distances from the side-gage fingers, so that the edge of a sheet may be moved by a registering-pad against a side-gage finger before the pad has ceased its action upon the sheet. In this event the sheet is liable to be injured by the continued action of the pad, if it be rigidly attached to its finger-bar, which cannot further move the sheet without bending it. Hence I have mounted the pads so that they will be individually subject to a balanced tension in such manner that when the resistance against a pad is increased by the stopping of the sheet against the gage-fingers it may yield and pass over the sheet without injuring it.

The registering-pad which I prefer to employ is shown particularly in Figs. 67, 68, and 69. The pad 227 is shown as a rubber ring mounted on a thimble 229, which turns loosely on a pivot 230 held by the branching end of the finger-bar 228. A rib or key 231 on the pivot 230 extending into a portion of the finger-bar 228 prevents the pivot from turning. (See Fig. 68.) The key 231 also extends into a notch or recess 232 in the thimble 229, and limits the movement of the thimble upon the pivot. A spring 233 between the thimble 229 and the bar 228 normally holds the thimble against the key in the position shown in Fig. 69, but by yielding permits the thimble to turn on its pivot in the direction of the arrow in Fig. 69 to the extent permitted by the recess. The tension of the spring effectively holds the thimble and pad against turning while a sheet is being moved by the pad, but when the resistance of the sheet to movement is increased, as by contact with a gage-finger, the spring will yield and allow the pad 227 to roll on the sheet without moving it.

Each bar 228 is operated independently, and I will describe the construction and operation of the mechanism which operates one bar 228, and it will be understood that similar mechanism operates each other bar.

234 is an ear-piece on the bar 201 to which are pivoted the horizontally-extending link 235 and the downwardly-extending link 236. (See Figs. 62 and 63.) To the lower end of the link 236 is pivoted the horizontal bar 237, which is also pivoted to the lower end of an eccentric-strap 238, the upper end of which is pivoted to the outer end of the link 235. An eccentric 239, carried by the shaft 217, operates the strap 238. To the outer end of the bar 237 is pivoted the finger-bar 228, and a spring 240, attached to the bar 237, operates on the finger-bar 228 and presses it normally upward. The upward movement of the finger-bar 228, under the action of the spring 240, when the registering-pad is not in contact with the bracket 226, is limited by a stop 242 on the bar 237, adapted to be struck by a lug 241 on the end of the bar 228.

When the shaft 217 is at rest, as described in connection with Figs. 66 and 30, the parts which operate the registering-pads will be in the position shown by full lines in Fig. 62, with the pad 227 in its normal position. When the shaft 217 makes a revolution in the direction indicated by the arrow in Fig. 62, the eccentric 239 operates to move the strap 238. The movement communicated to the strap 238 by the eccentric 239 is modified and controlled by the link 235 and is transmitted from the lower end of the strap through the medium of the bars 237 and 228 and under the control of the link 236 to the pad 227, so as to cause the center of the pad 227 to move in a pathway indicated by a dotted line $b$ in Fig. 62. From the normal position shown by full lines in Fig. 62 the parts will assume successively the positions shown by dotted lines in Fig. 62, by full lines in Fig. 63, by dotted lines in Fig. 63, and, finally, the normal position shown by full lines in Fig. 62, in which position they will remain until the parts are again operated.

When the center of the pad 227 has reached the point $b'$ in its pathway $b$, the circumference of the pad will have reached the position indicated by the dotted arc $227^a$, Fig. 62, and from thence the pad will move horizontally, being held by the bracket 226 from further upward movement until its center reaches the point $b''$ in its pathway $b$ and its circumference the position indicated by dotted arc $227^b$. It is during this horizontal portion of its movement that the pad acts to move the sheet sidewise. While the pad 227 is making its horizontal movement under the bracket 226, the finger-bar 228 is deflected with respect to the bar 237 by turning on its pivotal connection with that bar, as shown in Fig. 63, and because the bar 228 is held up by the spring 240 the pad 227 will act with a yielding pressure against the bracket 226, so that it may accommodate itself to varying thicknesses of sheets.

The shaft 217, which operates the arms 228 and their pads 227, is moved intermittently in the manner described for the purpose of causing the pads 227 to move quickly when they register a sheet and then to remain at rest until the registered sheet has passed away and another sheet has come into position to be acted upon.

It is at times desirable to maintain the frictional pad 227 out of action. This may be done by providing a clutch to throw the eccentric 239 out of connection with the shaft 217. This clutch is best shown in Figs. 1, 4 and 64. Fig. 4 shows the clutch in engagement. Fig. 1 shows the clutch partly disengaged, and Fig. 64 shows it in the same position as Fig. 1, with the parts arranged at right angles to the shaft 217.

243 is the hub of the eccentric 239, mounted loosely upon the shaft 217, and 244 is the clutch-spool, which is mounted on the shaft 217 by a key 245, so as to turn with the shaft while free to slide longitudinally upon it. The hub 243 and spool 244 are furnished on their adjacent ends each with a clutching-tooth adapted by engagement to drive the hub 243 and eccentric 239 from the spool 244. I employ but a single tooth upon the hub 243 and spool 244, so that when the hub and spool come into engagement the eccentric 239 will always occupy the same position with respect to the shaft 217 and will thereby cause the pad 227 to move in proper time with other parts of the machine. The hub 243 is held from longitudinal movement, when the spool 244 is moved, by a suitable collar, which is not shown in the drawings, as it lies in a cavity formed next to the shaft under the end of the hub. If care is taken to disengage the clutch only when the shaft 217 is at rest, the pad 227 will always occupy its normal position when it is out of action. The spool 244 may be moved longitudinally on the shaft 217 to engage or disengage the eccentric-hub 243 by a strap-lever 246, fulcrumed to an ear 247 on the bar 201 and encircling the spool 244, with which it engages by pivoted lugs 249, extending into a groove in the spool. The lever 246 may be provided with a handle 248. In Fig. 4 dotted lines show the position of a strap 246 and its handle when a clutch is disengaged.

250 is a spring attached at one end to the ear-piece 234 and at its other end bearing against a pin 251 on the strap-lever 246 and adapted to retain the lever from accidental movement either when the clutch is engaged or when it is disengaged.

One or more of the frictional pads 227 may thus be put out of action. It is usual to put out of action all pads except those operating upon the two ends of the sheets. The most forward pad usually acts upon all lengths of sheets; but the other pads may be put in or out of action, so as to cause one pad to operate near the rearmost end of a sheet according to the length of the sheets which are being fed by the machine.

*The final spacing-out and separating devices.*—These devices consist of a pair of feeding-rollers, a stop-gage for causing the sheets to be presented to the rollers at precise intervals, and an adjustable sheet-guide to direct the sheets as they pass from the rollers, and are similar to devices shown in my Letters Patent No. 544,764, dated August 20, 1895. The lower feeding-roller 252 consists of a series of disks 253, carried by a shaft mounted in suitable bearings carried by the machine-frame, and the upper feeding-roller 254 consists of a series of disks 255, carried by a shaft mounted in bearings held in oscillating frames 256, so as to give to the upper roller an oscillating motion over a portion of the lower roller. The disks 253, 255 may be mounted on their respective shafts in any well-known manner. In the drawings, the disks 253 are provided with hubs screwed or keyed to the shaft which carries them, but the disks 255 are secured in a manner presently to be described. In Fig. 70 a portion of the disk 253 is shown broken away to expose other parts. The disks 253 255 move in contact and may be composed, externally, of any suitable material for acting upon the sheets which pass between them. The disks rotate constantly in the direction indicated by arrows and are properly placed to receive the sheets as they pass from the conveyer.

257 is a bar supported by the frames 256. The shaft of the upper roller 254 is of such small diameter that it will bend easily, and it is supported at intervals by bearings 258, each provided with lugs 259 and 260. The bearings 258 are supported by the bar 257 through the medium of pendants 261, to which the lugs 259 are pivoted in such manner that the bearings 258 may oscillate freely in a vertical direction.

262 are springs bearing at one end upon the bar 257 and at the other end against the lugs 260, and tend to depress the bearings 258 and thereby force the shaft of the upper roller and the disks carried thereby downward to produce pressure between the disks 255 and 253.

The upper ends of the springs 262 bear against the ends of threaded plugs 263, passing through the bar 257, and by turning these plugs, as by a wrench applied to their upper squared ends, the plugs may be raised or lowered to adjust the tension of the springs and regulate the pressure between the disks 255 and 253. When a plug 263 has been adjusted, it may be secured by a clamp 264. (Shown in Fig. 74 as inserted at one end in a socket in the bar 257 and pressed by a clamping-screw at its other end.)

265 are rods which pass loosely through the plugs 263, the springs 262, and the lugs 260 and terminate at their lower ends in buttons 266, adapted to engage the lugs 260. The upper ends of the rods 265 pass through a bar 267 parallel to and over the bar 257. The bar 267 is carried by arms 268, pivoted to lugs 269 on the bar 257 and may be freely oscillated.

270 is a rod supported by bearings on the bar 257 and extending parallel to the bars 257 and 267 under the arms 268. The rod 270 is provided with cam projections 272 under the arms 268, and by means of a handle 271 on the rod 270 the rod and the cam projections thereon may be rocked.

273 are nuts on the upper ends of the rods 265, which support the rods from the bar 267, and by their adjustment the length of the rods below the bar 267 may be regulated.

When the parts are in the positions shown in Figs. 70, 72, and 74, the arms 268 may rest upon the rod 270, thereby supporting the bar 267 in the position shown with the rods 265 hanging loosely, so that their buttons 266 will not bind the lugs 260 against the action of the springs 262. When the rod 270 is rocked, the cam projections 272 thereon lift the arms 268 and raise the bar 267 with the rods 265, so that the buttons 266 thereof engage the lugs 260 and thereby lift the bearings 258 and the roller 254 to cause the disks 255 to move out of contact with the disks 253. The parts will then occupy the positions shown in Figs. 71 and 73. The disks 255 are raised, as described, whenever the machine is not in operation in order to relieve the pressure between the disks 253 and 255 and thereby prevent indentation or flattening of the elastic covering of the disks by long-continued pressure at one point.

274 is a spring attached to the bar 257, which, by acting on a projection from the rod 270 or form a part of the handle 271, serves to retain the rod and handle in either of the positions shown in Figs. 72 or 73.

The disks 255 of the upper feeding-roller are mounted on spools 275, one disk being formed on each end of a spool. This construction is shown best in Fig. 75, where 275$^a$ represents rubber bands forming the rims of the disks. The bores of the spools 275 are enlarged toward each end, so that a spool touches the shaft of the roller 254 only at about the middle of the length of its bore and the spool is free to rock slightly on its central bearing on the shaft. The spool may be prevented from turning on the shaft or from moving longitudinally thereon by set-screws, as shown.

By the construction described the disks 255 can very readily accommodate themselves to any variation in the thickness of the sheets passing between them and the disks 253, each disk 255 being able to yield to a certain extent independently of each other disk 255. This is effected, first, by a slight rocking of the spools 275 upon their central bearings; secondly, by a slight bending of the thin flexible shaft on which the spools are mounted, and, thirdly, by the yielding of the springs which press the bearings of the shaft.

The frames 256 are mounted on inwardly-projecting portions of the bearings 276, which support the shaft of the lower feeding-roller, (see Fig. 10,) so that when the frames 256 oscillate the upper feeding-roller will move in a path concentric with the axis of the lower feeding-roller.

277 is a shaft arranged across the machine parallel with the shaft of the lower feeding-roller and supported by bearings carried by the machine-frame. (See Fig. 23.) Fixed on the shaft 277 are cams 278, one on each side of the machine. An arm 279 projects from each oscillating frame 256 and is adapted to be operated by a cam 278, preferably through the medium of an antifriction-roller 280, carried by the arm.

281 are springs which connect the arms 279 or projections therefrom to a fixed part of the machine and tend to hold the arms against the cams 278. When the shaft 277 rotates, the cams 278 operate the arms 279 and rock the frames 256, bar 257, and parts carried thereby, so as to move the upper feeding-roller in the manner described.

The normal position of the upper feeding-roller 255 is that shown in Figs. 1, 2, and 3, with the roller farthest removed from the conveyer. The cams 278 are shaped to communicate a short quick oscillation to the upper feeding-roller and to allow that roller to remain for the most part in its normal position. Fig. 70 shows the position of the upper feeding-roller when the roller is nearest to the conveyer. The shaft 277 is driven at such speed that one oscillation of the top feeding-roller will take place with each stroke made by the frictional-pads of the registering device.

282 is a rocker-bar, located parallel to the feeding-rollers and above the pathway of the sheets on the side of the feeding-rollers opposite the conveyer (see Fig. 10) and supported by bearings formed in brackets 283 on the machine-frame.

284 are a series of fingers carried by the rocker-bar 282 and terminating in lips or projections 285 directed toward the lower feeding-roller. (See Figs. 1 and 70.) Normally the lips 285 rest against the lower feeding-roller, as shown in Fig. 1, a short distance from the intaking-line between the feeding-disks 253 255 on that side of said line on which the sheets approach the disks. The lips 285 are adapted to intercept the advanced free sheet as it passes from the conveyer and to prevent it from being taken in by the disks 253 255 until the lips are moved out of the way.

I have provided the disks of the lower feeding-roller with shoulders 286, upon which the lips 285 may rest, and one shoulder 286 is shown adjacent to each alternate disk 253; but this arrangement may be varied. The shoulders 286 may be less in diameter than the disks 253, to permit the points of the lips 285, when resting upon the shoulders, to pass below the peripheries of the disks for the purpose of preventing the edge of a sheet from passing between the points of the lips and the shoulders on which they rest. When the bar 282 is rocked, the lips 285 rise and the sheet is permitted to pass between the feeding-disks. The lips 285 are usually returned to their normal position before the sheet has passed completely between the disks and rest upon the moving sheet.

287 are arms fixed one on each end of the rocker-bar 282, Fig. 10. Each arm 287 is operated by a flange or rib 288, projecting from the side of a cam 278. (See Fig. 23.) The flanges 288 may operate on the arms 287 through the medium of antifriction-rollers 289, carried by the ends of the arms.

290 are springs which connect the arms 287 or projections therefrom to the upper ends of the brackets 283 and operate, through the medium of the arms 287, to rock the bar 282 and press the lips 285 against the shoulders 286.

When the flanges 288 engage the arms 287, the arms are depressed and the bar 282 is rocked to raise the lips 285 from the shoulders 286. In Fig. 2 a flange 288 is shown about to make contact with an arm 287, and in Fig. 70 a flange is shown acting on an arm and depressing it. When the lips 285 rise, they pass between the disks 255 of the upper feeding-roller to a position above the sheets passing between the disks. When the arms 287 are released from the action of the flanges 288, the lips 285 are returned to their normal positions by the action of the springs 290. I prefer to arrange the flanges 288 in such positions on the cams 287 and to make the flanges of such length that the bar 282 will be rocked at such times as to cause the lips 285 to be raised and lowered simultaneously with the forward and return oscillations, respectively, of the top feeding-roller.

The purpose of oscillating the top feeding-roller is fully described in my Letters Patent on a similar device, No. 544,764, dated August 20, 1895, and reference may here be had thereto for such description.

The sheet-guide which I have shown consists of a plate 291, placed forward of the feeding-rollers and below the pathway of the sheets, and is carried by a bar 292, supported in bearings shown as formed in the brackets 283, in which it may be rocked to adjust the plate 291 to any required angle with reference to the feeding-rollers. (See Figs. 1, 10, and 70.) On an end of the bar 292 is fixed an arm 293, adapted to be clamped to the machine-frame, so as to lock the bar 292 and plate 291 in any adjusted position. The feed-guide plate is shown by full lines in a horizontal position in Figs. 1 and 70 and by dotted lines in an inclined position in Fig. 70. The edges of the plate 291 adjacent to the feeding-rollers may be notched to receive the disks 253, as shown in Fig. 10.

The position of the sheet-guide plate and the speed of the feeding-rollers may be adjusted in the manner and for the purposes described in Letters Patent granted to me, No. 540,814, dated June 11, 1895, page 11, lines 33 to 117, inclusive.

*The driving mechanism.*—In order to keep the operative side of my machine clear from all parts not necessarily placed upon that side, I have located the driving devices upon the back side of the machine, as shown in Figs. 3, 4, 5, and 23.

294 is a gear mounted loosely upon a stud carried by the frame side 5. The hub of this gear (shown broken away and marked 294ª, in Fig. 4) may be extended and a proper device placed thereon to receive power in any suitable manner, either from the machine which is being supplied with sheets or from any other suitable source.

295 is a gear mounted on a stud carried by the frame 5 and driven by the gear 294. Secured to the gear 295 so as to turn with it is a gear 296. The withdrawing-drum 128 may be driven from the gear 296 through the medium of intermediate gears 297 298 and the gear 299 on the journal of the drum. By substituting gears 296 of different sizes the speed of the withdrawing-drum and of the parts driven therefrom may be varied.

300 is a gear mounted on a stud carried by the frame 5 and is driven from the gear 299 through the medium of compound intermediate gears 301 302, which are secured together and turn upon a stud carried by an adjustable stud-plate on the frame 5. By varying the size of the gears 301 302 the speed of the gear 300 and of the parts driven therefrom may be varied in respect to the speed of the withdrawing-drum. Secured to the gear 300, so as to turn with it, is a gear 303.

The initial sheet-withdrawing roller 143 is driven by the gear 303, transmitting power to the gear 304, fixed on the journal of the roller. When the speed of the roller 143 is to be uniform, the gears 303 304 may be of ordinary construction, but by employing cam-shaped gears the speed of the roller 143 may be made variable.

The gear 303 has at all times a uniform rate of rotation, but when cam-shaped gears are employed the gear 304 and roller 143 will be driven with a speed variable between different portions of each rotation, although the gears 303 304 will make each one complete rotation in the same time.

The cam-gears 303 and 304 may from time to time be replaced by other cam-gears having different shapes from those shown. Each pair of these gears must, however, at all times be so shaped and placed that they will drive the roller 143 in such manner that its frictional pads 148, while in contact with the drum 128, will move at the same surface speed as the drum, although the gears may be shaped to drive the roller 143 at a different rate of speed with one pair of gears than with another pair when the pads 148 are not in contact with the drum 128.

When the gears 303 304 are so arranged that the high part of the gear 303 is driving the low part of the gear 304, as shown in Fig. 3, at the moment that the pads 148 are in contact with the drum 128, these high and low parts of the gears 303 304 are proportioned to give to the frictional pads of the roller 143 a surface speed equal to the surface speed of the drum 128 and are continued to the extent required to drive the roller 143 at a uniform speed while its frictional pads contact with the drum; and when the gears are thus arranged in respect to the roller 143 and the pads of the roller have ceased to make contact with and are turned away from the drum, the low part of the gear 303 will drive the high part of the gear 304, and the gear 304 and the roller 143 will move slower than the same move when the pads 148 are in contact with the drum. This variable motion in the roller 143 may be called "retarded motion."

When the gears 303 304 are so arranged that the low part of the gear 303 is driving the high part of the gear 304 at the moment that the pads 148 are in contact with the drum 128, these low and high parts of the gears 303 304 are proportioned to give to the frictional pads of the roller 143 a surface speed equal to the surface speed of the drum 128 and are continued to the extent required to drive the roller 143 at a uniform speed while its frictional pads contact with the drum, and when the gears are thus arranged in respect to the roller 143 and the pads of the roller have ceased to make contact with and are turned away from the drum, the high part of the gear 303 will drive the low part of the gear 304, and the gear 304 and roller 143 will move faster than the same move when the pads 148 are in contact with the drum. This variable motion in the roller 143 may be called "accelerated" motion.

If pairs of gears 303 304 variously proportioned as between their high and low parts be substituted for one another, they may communicate to the roller 143 various degrees of either retarded or accelerated motion.

As the relative proportions of the radii of those parts of the gears 303 and 304, which are in mesh when the frictional pads of the drum 143 are in contact with the drum 128, vary with each pair of substituted gears, it is evident that in order to maintain the surface speed of the pads of the roller 143, the same as the surface speed of the drum 128, when the pads are in contact with the drum, the speed of the gear 303 must be varied in respect to the speed of the drum 128 with each change in the proportions of the gears 303 304. This variation in the speed of the gear 303 may be obtained by changing the speed of the gear 300 in the manner described.

As the speed of the gear 303 is adjusted, as described, and since the gear 304 and roller 143 make one complete revolution with each rotation of the gear 303, it is evident that the total number of complete rotations which the roller 143 will make in any given interval will vary with each change made in the variableness of the speed of the roller.

As compared with a uniform rate of rotation, I find it practical to vary the speed of the roller 143 from a retarded motion such that the roller will operate to withdraw but one sheet in the time that two sheets would be withdrawn were the speed of the roller uniform, to an accelerated motion such that the roller will operate to withdraw three sheets in the time that two sheets would be withdrawn by a uniform rotation.

By changing the speed of the roller 143, as described, the extent to which a sheet will be withdrawn before the withdrawal of another sheet is commenced and the rapidity with which sheets will be removed from the pack without increasing the speed at which the sheets are moved forward by the drum 128 and the rollers operating in conjunction therewith may be varied. When the roller 143 is driven with a retarded motion, the sheets will be individualized slowly from the pack and a sheet will be withdrawn to a considerable distance by the withdrawing-drum before the following sheet is brought under the action of the drum. When the roller 143 is driven with an accelerated motion, the sheets will be individualized rapidly from the pack and a sheet will be withdrawn to a comparatively small distance by the withdrawing-drum before the following sheet is brought under the action of the drum. By a proper adjustment of the variableness of the speed of the roller 143, with respect to the length of sheets, the roller 143 may delay the individualizing of a sheet from the pack until the preceding sheet has been wholly withdrawn, so that the sheets will not be overlapped as they are removed from the pack.

The shaft 124, which controls the valve of the individualizing device, may be driven from a gear 305 on the journal of the initial sheet-withdrawing roller 143 through the medium of intermediate gears 306 and 307 and the gear 308, fixed on the shaft 124. (See Fig. 17.)

I prefer to attach the gear 308 to the shaft 124 by a clutch connection to permit the individualizing device to be stopped while other parts of the machine continue in operation, so that sheets lying upon the conveyer and withdrawing-drum may be fed away without removing additional sheets from the pack, as is sometimes required. In the form of clutching device shown the gear 308 is loosely mounted on the shaft 124 in such manner as to be free to turn upon the shaft without being able to move lengthwise upon it, and the hub of the gear is provided with a clutching-tooth.

309 is the spool of the clutching device, mounted on the shaft 124 so as to turn with the shaft while having freedom of movement longitudinally upon it. The spool 309 is provided with a disk 310, by which it may be moved longitudinally on the shaft 124 to bring a clutching-tooth carried by it into engagement with the tooth on the hub of the gear. In Fig. 4 the clutch is shown in engagement, and the shaft 124 is driven. In Fig. 5 the spool 309 is shown drawn back on the shaft 124 to disengage the shaft from the control of the gear 308. This clutch is provided with but a single clutching-tooth in order that the shaft 124 may be clutched to the gear 308 always in the same relative position, so that the cam 123 will operate the individualizing device in harmony with the movements of the initial sheet-withdrawing roller.

The gear 36, which operates the table-lifting devices, is mounted on a stud carried by the frame 5, and is driven by the gear 300.

312, 313, 314, 315, and 316 are shafts extended upon the side frame 5 and supported by bearings carried by the frame, the shafts 312 and 314 being horizontally and the shafts 313, 315 and 316 being vertically arranged. The long tubular bearings of the shafts 315 316 so cover the shafts that only their ends are exposed to view. In Fig. 3 these shafts are indicated by dotted lines. The shaft 312 is driven by a bevel-gear 317 thereon, which meshes with a bevel-gear 311, secured to the gear 36. The upright shaft 313 is driven by a bevel-gear 319 thereon, which meshes with a similar gear 318 on the shaft 312. The transverse shaft 210, which drives the registering device is driven from the upright shaft 313 through the medium of bevel-gears 320 320. The shaft 314 is driven from the upright shaft 313 by a bevel-gear 321 thereon, which meshes with the bevel-gear 319. The upright shaft 315 is driven from the shaft 314 through the medium of bevel-gears 322 322, and the transverse shaft 277 is driven from the shaft 315 through the medium of bevel-gears 323 323.

The rollers 157 158 of the withdrawing device are driven by a gear 324 on the withdrawing-drum gearing into gears 325 325 on the rollers 157 158. These gears are on the inner side of the frame 5.

The conveyer-roller 199 second from the withdrawing-drum 128 is driven from the gear 324 through the intermediate gear 326 driving the gear 327 on the roller 199. The intermediate 326 may run loosely on an extension of the bearing of that roller 199 adjacent to the withdrawing-drum. (See Figs. 1, 3, and 4.)

328 is a side shaft supported by bearings carried by the side frame 5 and driven by the second roller 199 from the withdrawing-drum 128 through the medium of bevel-gears 329. Each roller 199, except the one second from the withdrawing-drum, is driven by the shaft 328 through the medium of bevel-gears 330.

331 is a gear mounted on a stud carried by the frame 5 and driven by the gear 294. Secured to the gear 331, so as to turn with it, is a gear 332, which drives a gear 333 on a stud carried by the frame 5 through the medium of the intermediate gear 334.

The upright shaft 316 is driven by a bevel-gear 336 thereon, which meshes with the bevel-gear 335, secured to the gear 333. The shaft of the bottom feeding-roller 252 is driven from the shaft 316 through the medium of bevel-gears 337 337, and by substituting gears 333 of different sizes the speed of the feeding-rollers may be varied. The top feeding-roller 254 is driven from a gear 338 on the shaft of the lower feeding-roller, driving a gear 339 on the shaft of the top feeding-roller.

By the method of driving described, when the speed of the withdrawing-drum is changed to vary the speed with which sheets are moved through the machine the speed of all the other portions of the machine, except the speed of the final feeding-rollers, is varied proportionally. The speed of the feeding-rollers may be changed to suit different manners of feeding without affecting the speed of the other parts of the machine. The initial-sheet-withdrawing cylinder, the individualizing device, the registering device, and the reciprocating parts of the final spacing-out device are geared together in such manner that these parts each make a single turn or movement with each sheet fed. When the speed of the initial-sheet-withdrawing roller is varied, the speeds of the individualizing device, the pack-elevating mechanism, the registering device, and the reciprocating parts of the final spacing-out device are varied correspondingly. When my feeding-machine is driven directly from a shaft of the machine being supplied with sheets, any change in the speed of that machine changes the speed of the entire feeding-machine correspondingly.

*Operation of the machine.*—From the foregoing description of the machine its operation in feeding sheets will be readily understood. The operation of the parts employed in separating and withdrawing the sheets from the pack has already been described. The sheets are received from the withdrawing-drum upon the conveyer. When the front edge of the free advanced sheet on the conveyer reaches the front stop, the sheet is arrested and the registering device operates to register it. The front stop-fingers then recede and release the sheet, which is seized by the feeding-disks and is delivered to the mechanism which is to perform a subsequent operation upon it.

It is apparent that many details of construction shown are not material to my invention and may be varied in many ways without departing from it, and that portions of my invention may be employed independently of other portions of it, and that in adapting my improved feeding mechanism to different purposes features of the mechanism not required may be omitted.

Having now described my invention, what I claim as new, and desire to secure by Letters Patent, is—

1. In a machine for feeding sheets from a pack, the combination of the gear-racks 6, 6, 6, 6, shafts 8, 8, gears 9, 9, 9, 9, bearings 10, 10, 10, 10, flanges 11, 11, 11, 11, shaft 12, bearings 13, 13, worm-wheels 14, 14, worms 15, 15, table 16, shaft 19, bevel-gears 22 and 23, bearing 25 and means to drive the shaft 19, all combined and arranged substantially as and for the purpose described.

2. In a machine for feeding sheets from a pack, the combination of a table for supporting a pack of sheets, means for removing the sheets successively from the uppermost face of the pack, mechanism for gradually elevating said table, power devices for driving said mechanism embracing a pair of frictional disks adapted to run together in peripheral contact and to transmit power and speed from one portion to another of said power devices, an oscillating support carrying one of said disks, a spring adapted to act on said support to press the said disks against one another, and devices controlled by the movement of the supporting-table and pack to oscillate said support against the action of said spring and thereby separate said disks when the top of the pack rises above a certain normal level, so as to stop the further upward movement of the table.

3. In a machine for feeding sheets from a pack, the combination of a table for supporting a pack of sheets, means for removing the sheets successively from the uppermost face of the pack, the shaft 26, a device for gradually elevating said table driven by the shaft 26, the frictional disks 31 and 32, oscillating stud 33 on which the disk 32 is mounted, power devices for driving said disk 32, a spring 43, lever 44 having arms 45 and 46, arm 47, devices controlled by the movement of the supporting-table and pack, and a connection between said devices and the arm 46 of said lever 44, all combined and operating substantially as described to regulate the level of the top of the pack as the sheets are successively removed therefrom.

4. In a machine for feeding sheets from a pack, the combination of a table for supporting a pack of sheets, means for removing the sheets successively from the uppermost face of the pack, mechanism for gradually elevating said table, power devices for driving said mechanism embracing a pair of frictional disks adapted to run together in peripheral contact and to transmit power and speed from one portion to another of said power devices, a device for separating said disks one from another, a roller resting upon the pack of sheets and mounted so as to turn easily as the sheets are successively removed from under the roller, and a connection between said roller and the disk-separating device, the said roller and the connection therefrom being so combined with said disk-separating device that the disks will be separated and the movement of the table stopped when the top of the pack rises above a certain normal level.

5. In a machine for feeding sheets from a pack, the combination of a table for supporting a pack of sheets, means for removing the sheets successively from the uppermost face of the pack, mechanism for gradually elevating said table, power devices for driving said mechanism embracing a pair of frictional disks adapted to run together in peripheral contact and to transmit power and speed from one portion to another of said power devices, a device for separating said disks one from another, the oscillating shaft 49, arms 50, 50, bearings 51, 51, roller 52, projections 53, arm 54, and a connecting-rod 55 from said arm 54 to said disk-separating device, all combined and operating substantially as described to regulate the level of the top of the pack as the sheets are successively removed therefrom.

6. In a machine for feeding sheets from a pack, the combination of a table for supporting a pack of sheets, a device for gradually elevating said table embracing a vertically-arranged shaft 19, power devices for driving said shaft 19 embracing a wheel 29 mounted loosely thereon and means to connect the wheel 29 to the shaft 19 or to disengage it therefrom consisting of, the boss 59 rigidly connected with said wheel, hub 61 fixed on the shaft 19, clutch-teeth 60 and 62, sleeve 63, teeth 64 and 65, and means to hold the wheel 29 from vertical displacement under the action of the sleeve 63, and a hand device connected to said shaft for turning it by hand to raise or lower the table when the shaft 19 is disengaged from the wheel 29.

7. In a machine for feeding sheets from a pack, the combination of a table for supporting a pack of sheets having a series of slots extending transversely into it from one side, a device for gradually elevating said table, a side gage consisting of a series of vertical arms adapted to move in the slots of the table, a base-piece below the table to support said arms, a hand-operated device to act on said base-piece to move it and the arms carried thereby transversely across the machine, and guides adapted to direct said base-piece when it moves, all combined and operating to adjust the pack of sheets transversely while permitting freedom of vertical movement to the table.

8. In a machine for feeding sheets from a pack, the combination of a table for supporting a pack of sheets having a series of slots extending transversely into it from one side, a device for gradually elevating said table, the vertical arms 66, base 67, guides 68, screws 70, 70, bosses 71, 71, shaft 73, bevel-gears 74, and a hand device connected to said shaft 73 for turning it, all combined and operating substantially as and for the purpose described.

9. In a machine for feeding sheets from a pack, the combination of a casing or shell arranged adjacent to an edge of the pack, a passage formed in said casing or shell, a piston adapted to said passage, a suction-nozzle carried by said piston in such manner that its suction-mouth may overlie an edge of the sheets in the pack, a vacuum-chamber, a suction-creating device adapted to exhaust air from said chamber and to maintain a partial vacuum therein when the chamber is closed to the external atmosphere, a pneumatic connection from that portion of said passage which lies above the piston to said vacuum-chamber, and means for establishing a pneumatic connection from said nozzle alternately to said chamber and to the atmosphere, whereby, the said nozzle may be moved toward the pack and caused to place its mouth upon the outermost sheet and suck thereon, may be moved away from the pack thereby bending outwardly the portion of the sheet sucked upon and, finally, may be caused to release the sheet when the suction in the nozzle is broken.

10. In a machine for feeding sheets from a pack, the combination of a casing or shell arranged adjacent to an edge of the pack of sheets, a vacuum-chamber formed in said casing or shell, a suction-creating device adapted to exhaust air from said chamber and to maintain a partial vacuum therein when the chamber is closed to the external atmosphere, a passage formed in said casing or shell, a piston adapted to said passage, an opening from that portion of said passage which lies above the piston to said vacuum-chamber, a suction-nozzle carried by said piston in such manner that its suction-mouth may overlie an edge of the sheets in the pack, a pneumatic connection from the suction-nozzle to the vacuum-chamber, an opening from the atmosphere into said pneumatic connection, and a valve placed in the course of said connection adapted to place the nozzle, alternately, in pneumatic connection with said chamber and with said opening from the atmosphere, all combined and operating to cause the suction-nozzle to seize the outermost sheet in the pack at its edge and to bend a portion of the edge seized upon outward from the pack.

11. In a machine for feeding sheets from a pack, the combination of a casing or shell arranged adjacent to an edge of the pack of sheets, a vacuum-chamber formed in said casing or shell, a suction-creating device adapted to exhaust air from said chamber and to maintain a partial vacuum therein when the chamber is closed to the external atmosphere, a passage formed in said casing or shell, a piston adapted to said passage, an opening from that portion of said passage which lies above the piston to said vacuum-chamber, a spring adapted to act on said piston to move it outward in said casing or shell, a suction-nozzle carried by said piston in such manner that its suction-mouth may overlie an edge of the sheets in the pack, a pneumatic connection from the suction-nozzle to the vacuum-chamber, an opening from the atmosphere into said pneumatic connection, and a valve placed in the course of said connection adapted to place the nozzle, alternately, in pneumatic connection with said chamber and with said opening from the atmosphere, all combined and operating to cause the suction-nozzle to seize the outermost sheet in the pack at its edge and to bend a portion of the edge seized upon outward from the pack.

12. In a machine for feeding sheets from a pack, the combination of a casing or shell arranged adjacent to an edge of the pack of sheets, a vacuum-chamber formed in said casing or shell, a suction-creating device adapted to exhaust air from said chamber and to maintain a partial vacuum therein when the chamber is closed to the external atmosphere, a passage formed in said casing or shell, a piston adapted to said passage, an opening from that portion of said passage which lies above the piston to said vacuum-chamber, a spring adapted to act on said piston to move it outward in said casing or shell, a suction-nozzle carried by said piston in such manner that its suction-mouth may overlie an edge of the sheets in the pack, a pneumatic connection from the suction-nozzle to the vacuum-chamber, an opening from the atmosphere into said pneumatic connection, and a valve placed in the course of said connection adapted to place the nozzle, alternately, in pneumatic connection with said chamber and with said opening from the atmosphere, all combined and operating to cause the suction-nozzle to seize the outermost sheet in the pack at its edge and to bend a portion of the edge seized upon outward of the pack, and a lip or guard adapted to overlie the edge of the pack adjacent to said nozzle to intercept the edge of the sheet as it is bent outward for the purpose described.

13. In a machine for feeding sheets from a pack, the combination of a casing or shell arranged adjacent to an edge of the pack of sheets, a vacuum-chamber formed in said casing or shell, a suction-creating device adapted to exhaust air from said chamber and to maintain a partial vacuum therein when the chamber is closed to the external atmosphere, a passage formed in said casing or shell, a piston adapted to said passage, an opening from that portion of said passage which lies above the piston to said vacuum-chamber, a suction-nozzle carried by said piston in such manner that its suction-mouth may overlie an edge of the sheets in the pack, a pneumatic connection passing from said suction-nozzle through a cavity formed in the interior of said piston, thence through an opening in the side of the piston into a passage-way in the walls of said casing or shell and through said passage-way to said vacuum-chamber, an opening from the atmosphere into said passage-way, and a valve placed in the course of said passage-way adapted to place the said nozzle alternately in pneumatic communication with said chamber and with said opening from the atmosphere, all combined and operating to cause the suction-nozzle to seize the outermost sheet in the pack at its edge and to bend a portion of the edge seized upon outward from the pack.

14. In a machine for feeding sheets from a pack, the combination of a nozzle arranged adjacent to an edge of the pack, a pneumatic device adapted alternately to create and to destroy suction within said nozzle, means to move said nozzle to and from the surface of the pack, means to reciprocate said nozzle when it is moved away from the pack to cause the mouth of the nozzle to move from over the surface of the pack and to return and overlie the pack, a separating instrument adapted to pass under the edge of a sheet after a portion of that edge is bent outward, means to move said separating instrument after it has passed under the edge of a sheet to cause it to bend the edge of the sheet outward from the pack out of the pathway of the nozzle all combined and operating in such manner that the said nozzle may be moved toward the pack and caused to place its mouth upon the outermost sheet near an edge thereof and suck thereon, may be moved away from the pack thereby bending outwardly the portion of the sheet sucked upon, may be caused to release the sheet after the edge-separating instrument has passed under its outwardly-bent portion, may be moved away from over the sheet out of the pathway followed by the edge of a sheet as it is bent outward from the pack, and, finally, after the separating instrument has acted on the edge of the sheet and bent it outward out of the pathway of the nozzle, may be caused again to pass over the edge of the pack and move into contact with a second sheet and act thereon.

15. In a machine for feeding sheets from a pack, the combination of a casing or shell arranged adjacent to an edge of the pack, a passage formed in said casing or shell, a piston adapted to said passage, a vacuum-chamber, a suction-creating device adapted to exhaust air from said chamber and to maintain a partial vacuum therein when the chamber is closed to the external atmosphere, a pneumatic connection from that portion of said passage which lies above the piston to said chamber, a spring adapted to act on said piston to move it outward in said casing or shell, a cylinder forming the outward end of said piston, a passage formed in said cylinder substantially at right angles to said passage in said casing or shell, a piston adapted to said passage in said cylinder, a spring adapted to act on said piston to move it outward in said cylinder, a stop adapted to limit the outward movement of said piston in said cylinder, a chamber formed in said cylinder in the rear of the piston therein and connected with the said passage in which the piston moves, a suction-nozzle carried by the last said piston in such manner that the mouth of the nozzle may overlie an edge of the sheets in the pack, means for establishing a pneumatic connection from said nozzle alternately to said vacuum-chamber and to the atmosphere, means to establish a pneumatic connection from said chamber in said cylinder alternately to said vacuum-chamber and to the atmosphere, an edge-separating instrument adapted to pass under the edge of a sheet after a portion of that edge is bent outward, means to move said separating instrument after it has passed under the edge of a sheet to cause it to bend the edge of the sheet outward from the pack out of the pathway of the nozzle all combined and operating in such manner that the said nozzle may be moved toward the pack and caused to place its mouth upon the outermost sheet near an edge thereof and suck thereon, may be moved away from the pack thereby bending outwardly the portion of the sheet sucked upon, may be caused to release the sheet after the edge-separating instrument has passed under its outwardly-bent portion, may be moved away from over the sheet out of the pathway followed by the edge of a sheet as it is bent outward from the pack, and, finally, after the separating instrument has acted on the edge of the sheet and bent it outward out of the pathway of the nozzle, may be caused again to pass over the edge of the pack and move into contact with a second sheet and act thereon.

16. In a machine for feeding sheets from a pack, the combination of the casing or shell 80, the vacuum-chamber 83, a suction-creating device adapted to exhaust air from said chamber and to maintain a partial vacuum therein when the chamber is closed to the external atmosphere, piston 84, spring 86, diaphragm 87, wall 88, passage-ways 89 and 90, cylinder 91, piston 92, chamber 97, spring 98, stop 99, tube 102, nozzle 103, passage-ways 105 and 106, hole 107, valve 108 provided with passages 109, 110, 111, 112, the passage 113, passage-ways 114 and 116, openings 115, 117, 118 and 119, an edge-separating instrument adapted to pass under the edge of a sheet after a portion of the edge is bent outward, and means to move said separating instrument after it has passed under the edge of a sheet to cause it to bend the edge of the sheet outward from the pack out of the pathway of the nozzle, all combined and operating substantially as shown and described.

17. In a machine for feeding or moving sheets, the combination of rotating frictional disks, a hollow shaft on which said disks are mounted, a slot through the side of said shaft, adjusting-nuts adapted to move longitudinally in said hollow shaft each having a part passing through said slot and connected to one of said disks, a device operating within said hollow shaft and acting on said nuts to adjust said disks through the medium of said nuts across the machine to bring them into proper positions relatively to the sheets which are to be fed or moved, and devices operating in conjunction with said disks to feed or move the sheets.

18. In a machine for feeding sheets from a pack, the combination of rotating frictional disks mounted adjacent to the pack of sheets and adapted by frictional contact to seize upon the surface of a sheet when the sheet is pressed against them, a hollow shaft on which said disks are mounted, a slot through the side of said shaft, adjusting-nuts adapted to move longitudinally in said hollow shaft each having a part passing through said slot and connected to one of said disks, a device operating within said hollow shaft and acting on said nuts to adjust said disks through the medium of said nuts across the machine to bring them into proper positions relatively to the sheets in the pack, and means to separate an edge of a sheet from the pack and press it against said disks whereby the sheets may be withdrawn from the pack.

19. In a machine for feeding sheets from a pack, the combination of the frictional disks 129, hollow shaft 130 provided with a slot 131, threaded rods 136, bearings 137 and 138, shoulders 139, hand-wheels 140, threaded nuts 141, clamping-nuts 142, and means to separate an edge of a sheet from the pack and press it against said disks, all combined and operating substantially as described for the purpose of adjusting the disks 129 into proper positions relatively to the sheets and to withdraw the sheets from the pack.

20. In a machine for feeding sheets from a pack, the combination of a rotating cylinder or drum mounted adjacent to the pack of sheets and provided with frictional disks adapted by frictional contact to seize upon the surface of a sheet when the sheet is pressed against them, a hand-operated device carried by said cylinder or drum adapted to adjust said disks across the machine to bring them into proper positions relatively to the sheets in the pack, means to separate an edge of a sheet from the pack and press it against said disks whereby the sheet may be withdrawn from the pack, a roller provided with frictional disks adapted to press the sheet against the disks of said cylinder or drum and assist in withdrawing the sheet, and means carried by said roller to adjust the disks of the roller to bring them opposite the disks of said cylinder or drum.

21. In a machine for feeding sheets from a pack, the combination of rotating frictional disks mounted adjacent to the pack of sheets and adapted by frictional contact to seize upon the surface of a sheet when the sheet is pressed against them, a hollow shaft on which said disks are mounted, a slot through the side of said shaft, adjusting-nuts adapted to move longitudinally in said hollow shaft each having a part passing through said slot and connected to one of said disks, a device operating within said hollow shaft and acting on said nuts to adjust said disks through the medium of said nuts across the machine to bring them into proper positions relatively to the sheets in the pack, and means to separate an edge of a sheet from the pack and press it against said disks whereby the sheets may be withdrawn from the pack, frictional disks adapted to press the sheet against the first-mentioned disks and assist in withdrawing the sheets from the pack, a threaded shaft on which the second-mentioned disks are mounted in such manner that by turning the disks they may be moved along the threaded shaft to adjust them to positions opposite the first-mentioned disks and means to secure the disks in any adjusted position.

22. In a machine for feeding or moving sheets, the combination of a rotating cylinder or drum provided with adjustable disks adapted to have sheets fed or passed over them, a hand-operated device carried by said cylinder or drum adapted to adjust said disks across the machine to bring them into proper positions relatively to the sheets to be fed or moved, a device carried by said drum forming a cylindrical support continuous from one of said disks to the other and arranged so as not to interfere with the adjustment of the disks and adapted to prevent that portion of the sheets lying between the disks from sagging as they pass over the drum, and devices operating in conjunction with said disks to feed or pass sheets over said cylinder or drum.

23. In a machine for feeding or moving sheets the combination of rotating frictional disks adapted to have sheets fed or passed over them, a hollow shaft on which said disks are mounted, a slot through the side of said shaft, adjusting-nuts adapted to move longitudinally in said hollow shaft each having a part passing through said slot and connected to one of said disks, a device operating within said hollow shaft and acting on said nuts to adjust said disks through the medium of said nuts across the machine to bring them into proper positions relatively to the sheets to be fed or moved, a device carried by said drum forming a cylindrical support between said disks arranged so as not to interfere with the adjustment of the disks and adapted to prevent that portion of the sheets lying between the disks from sagging as they pass over the drum, and devices operating in conjunction with said disks to feed or pass sheets over said cylinder or drum.

24. In a machine for feeding sheets from a pack, the combination of a rotating cylinder or drum mounted adjacent to the pack of sheets and provided with frictional disks adapted by frictional contact to seize upon the surface of a sheet when the sheet is pressed against them, a hand-operated device carried by said cylinder or drum adapted to adjust said disks across the machine to bring them into proper positions relatively to the sheets in the pack, a device carried by said drum forming a cylindrical support between said disks arranged so as not to interfere with the adjustment of the disks and adapted to prevent that portion of the sheets lying between the disks from sagging as they pass over the the drum, and means to separate an edge of a sheet from the pack and press it against said disks whereby the sheets may be withdrawn from the pack and passed over said drum.

25. In a machine for feeding sheets from a pack, the combination of rotating frictional disks mounted adjacent to the pack of sheets and adapted by frictional contact to seize upon the surface of a sheet when the sheet is pressed against them, a shaft on which said disks are mounted, means to adjust said disks longitudinally on said shaft to bring them into proper positions relatively to the sheets in the pack, two or more disks mounted fixedly on said shaft, rods carried by said fixed disks in a circumferential series in such manner as to form a cylindrical support for the sheets between the disks as they pass over the drum, a series of holes formed through said frictional disks through which said rods may pass without interfering with the adjustment of said disks, and means to separate an edge of a sheet from the pack and press it against said disks whereby the sheets may be withdrawn from the pack.

26. In a machine for feeding sheets from a pack, the combination of the frictional disks 129, hollow shaft 130 provided with a slot 131, fixed disks 132, 132 and 134, rods 133, threaded rods 136, bearings 137 and 138, shoulders 139, hand-wheels 140, threaded nuts 141, clamping-nuts 142 and means to separate a sheet from the pack and press it against said disks, all combined and operating substantially as and for the purposes described.

27. In a machine for feeding sheets from a pack, the combination of an individualizing device adapted to raise a portion of the outermost sheet at its edge from other sheets in the pack, two rotary separator-blades arranged with their axes of rotation in a straight line substantially parallel with that edge of the sheet which is raised by the individualizing device, having their separating edges spirally arranged about their axes of rotation each in a direction opposite to the direction taken by the edge of the other blade, placed upon opposite sides of the said individualizing device each with the advanced portion of its edge adjacent thereto, and adapted to enter the advanced portions of their edges first under the raised portion of the sheet and thereafter to act simultaneously upon the sheet passing under it in opposite directions from said individualizing device toward the side edges of the pack and separating the entire edge of the sheet from the pack and bending it outward therefrom, and means to move that portion of the individualizing device which acts upon the sheets out of the pathway of the edge of the sheet as it is bent outward.

28. In a machine for feeding sheets from a pack, the combination of an individualizing device adapted to operate upon the surface of the outermost sheet in the pack at a point on that edge of the sheet which lies most advanced in the direction in which the sheet is to be moved and to bend a portion of that edge outward without bending the entire edge of the sheet, two rotary separator-blades arranged with their axes of rotation in a straight line substantially parallel with that edge of the sheets which is operated on by the individualizing device, having their separating edges spirally arranged about their axes of rotation each in a direction opposite to the direction taken by the edge of the other blade, placed upon opposite sides of the said individualizing device each with the advanced portion of its edge adjacent thereto, and adapted to enter the advanced portions of their edges first under the raised portion of the sheet and thereafter to act simultaneously upon the sheet passing under it in opposite directions from said individualizing device toward the side edges of the pack and separating the entire edge of the sheet from the pack and bending it outward therefrom, and means to move that portion of the individualizing device which acts upon the sheets out of the pathway of the edge of the sheet as it is bent outward, and devices for seizing upon the edge of the sheet after it is bent outward and for withdrawing the sheet from the pack.

29. In a machine for feeding sheets from a pack, the combination with an individualizing device to raise a portion of an edge of the outermost sheet, of a rotating longitudinally-recessed roller 143 carrying the two separator-blades 149, 149ª, adapted to enter simultaneously under the raised portion of the outermost sheet and thereafter to act upon the sheet to separate its entire edge from other sheets in the pack and to bend that edge outward as the roller rotates, and means to move that portion of the individualizing device which acts upon the sheets out of the pathway of the edge of the sheet as it is bent outward.

30. In a machine for feeding sheets from a pack, the combination with an individualizing device adapted to operate upon the surface of the outermost sheet in the pack at a point on that edge of the sheet which lies most advanced in the direction in which the sheet is to be moved and to bend a portion of that edge outward, of a rotating roller arranged adjacent to and parallel with the edge of the pack so as to intercept the curved path traversed by the edge of a sheet when it is bent outward and having a portion of its body cut away on one side to form a recess through which the edge of the sheet when it is bent outward may freely pass, two blades each carried by the body of the roller and each projecting over a portion of said recess, each having its forward edge inclined with reference to the axis of the roller with the inclines of the edges of the two blades leading in opposite directions, and the two blades, as they rotate with the roller, being adapted to enter simultaneously under said bent-out portion of the edge of the sheet and thereafter to act upon the sheet to separate its entire edge from other sheets in the pack and to bend it outward therefrom, means to move that portion of the individualizing device which acts upon the sheets out of the pathway of the edge of the sheet as it is bent outward, and withdrawing devices acting on the outwardly-bent edge to withdraw the sheet from the pack.

31. In a machine for feeding sheets from a pack, the combination of an individualizing device adapted to raise a portion of the outermost sheet at its edge from other sheets in the pack, a longitudinally-recessed roller provided with a frictional surface and mounted adjacent to and partly overlying that edge of the outermost sheet in the pack which is raised by the individualizing device and rotating in a direction inward from the edge toward the body of the pack, two blades each carried by said roller, each having its forward edge inclined with reference to the axis of the roller with the inclines of the edges of the two blades leading in opposite directions, the two blades as they rotate with the roller being adapted to enter simultaneously under the raised portion of the sheet and thereafter to act upon the sheet to individualize the entire edge of the sheet from the pack and bend it outward therefrom through the longitudinal recess in the roller, means to move that portion of the individualizing device which acts upon the sheets out of the pathway of the edge of the sheet as it is bent outward, and a cylinder or drum adapted to act in conjunction with the frictional surface of the roller to withdraw the individualized sheet to a greater or less extent from the pack.

32. In a machine for feeding sheets from a pack, the combination of an individualizing device adapted to raise a portion of the outermost sheet at its edge from other sheets in the pack, a longitudinally-recessed roller provided with a frictional surface and mounted adjacent to and partly overlying that edge of the outermost sheet in the pack which is raised by the individualizing device and rotating in a direction inward from the edge toward the body of the pack, two blades each carried by said roller, each having its forward edge inclined with reference to the axis of the roller with the inclines of the edges of the two blades leading in opposite directions, the two blades as they rotate with the roller being adapted to enter simultaneously under the raised portion of the sheet and thereafter to act upon the sheet to individualize the entire edge of the sheet from the pack and bend it outward therefrom through the longitudinal recess in the roller, means to move that portion of the individualizing device which acts upon the sheets out of the pathway of the edge of the sheet as it is bent outward, and a cylinder or drum adapted to act in conjunction with the frictional surface of the roller to withdraw the individualized sheet to a greater or less extent from the pack, and an auxiliary withdrawing-roller adapted to press the partially-withdrawn sheet against the said cylinder or drum and to assist in withdrawing the sheet from the pack.

33. In a machine for feeding sheets from a pack, the combination of an individualizing device adapted to raise a portion of the outermost sheet at its edge from other sheets in the pack, a longitudinally-recessed roller provided with a frictional surface and mounted adjacent to and partly overlying that edge of the outermost sheet in the pack which is raised by the individualizing device and rotating in a direction inward from the edge toward the body of the pack, two blades each carried by said roller, each having its forward edge inclined with reference to the axis of the roller with the inclines of the edges of the two blades leading in opposite directions, the two blades as they rotate with the roller being adapted to enter simultaneously under the raised portion of the sheet and thereafter to act upon the sheet to individualize the entire edge of the sheet from the pack and bend it outward therefrom through the longitudinal recess in the roller, means to move that portion of the individualizing device which acts upon the sheets out of the pathway of the edge of the sheet as it is bent outward, and a cylinder or drum adapted to act in conjunction with the frictional surface of the roller to withdraw the individualized sheet to a greater or less extent from the pack, a series of auxiliary rollers adapted to press the partially-withdrawn sheet against the said cylinder or drum and to assist in withdrawing the sheet from the pack, and a sheet-guide adapted to direct the forward edge of the sheet as it passes from one withdrawing-roller to another.

34. In a machine for feeding sheets from a pack, the combination of an individualizing device adapted to raise a portion of the outermost sheet at its edge from other sheets in the pack, a withdrawing-drum mounted adjacent to the pack of sheets and adapted by frictional contact to seize upon the surface of a sheet when the sheet is pressed against it, a rotating longitudinally-recessed roller mounted adjacent to and partly overlying that edge of the outermost sheet in the pack which is raised by the individualizing device, carrying the separator-blades 149, 149$^a$, and the frictional pads 148, 148$^a$, and adapted as it rotates to pass the edges of the separator-blades first under the raised portion of the outermost sheet then to cause the blades to separate the entire edge of the sheet from other sheets in the pack and to bend that edge outward through the longitudinal recess in the roller and about the said drum and then to cause the frictional pads to press the edge of the sheet against the drum and thereby cause the sheet to be withdrawn to a greater or less extent from the pack, and means to move that portion of the individualizing device which acts upon the sheets out of the pathway of the edge of the sheet as it is bent outward.

35. In a machine for feeding sheets from a pack, the combination of a reciprocating suction-nozzle adapted to suck upon and raise a portion of the outermost sheet at its edge from other sheets in the pack, a withdrawing-drum mounted adjacent to the pack of sheets and adapted by frictional contact to seize upon the surface of a sheet when the sheet is pressed against it, a rotating longitudinally-recessed roller mounted adjacent to and partly overlying that edge of the outermost sheet in the pack which is raised by the suction-nozzle, having a portion of its body reduced at about the middle of its length to create a space for the suction-nozzle to operate in, carrying the separator-blades 149, 149$^a$, and the frictional pads 148, 148$^a$, and adapted as it rotates to pass the edges of the separator-blades first under the raised portion of the outermost sheet, then to cause the blades to separate the entire edge of the sheet from other sheets in the pack and to bend that edge outward through the longitudinal recess in the roller and about the said drum, and then to cause the frictional pads to press the edge of the sheet against the drum and thereby cause the sheet to be withdrawn to a greater or less extent from the pack, means to move the suction-nozzle out of the pathway of the edge of the sheet as it is bent outward, and a lip or guard adjacent to said nozzle and adapted to overlie the edge of the pack to intercept the edge of the sheet as it is bent outward for the purpose described.

36. In a machine for feeding sheets from a pack, the combination of an individualizing device adapted to raise a portion of the outermost sheet at its edge from other sheets in the pack, a withdrawing-drum mounted adjacent to the pack of sheets and adapted by frictional contact to seize upon the surface of a sheet when the sheet is pressed against it, a rotating longitudinally-recessed roller mounted adjacent to and partly overlying that edge of the outermost sheet in the pack which is raised by the individualizing device, carrying the separator-blades 149, 149ª, and the frictional pads 148, 148ª, and adapted as it rotates to pass the edges of the separator-blades first under the raised portion of the outermost sheet then to cause the blades to separate the entire edge of the sheet from other sheets in the pack and to bend that edge outward through the longitudinal recess in the roller and about the said drum and then to cause the frictional pads to press the edge of the sheet against the drum and thereby cause the sheet to be withdrawn to a greater or less extent from the pack, and means to move that portion of the individualizing device which acts upon the sheets out of the pathway of the edge of the sheet as it is bent outward, and means to drive the said roller with a variable speed of rotation and to change the speed of the roller from one form of variable speed to another form of such speed, substantially as and for the purpose described.

37. In a machine for feeding sheets from a pack, the combination of a withdrawing cylinder or drum mounted adjacent to the pack of sheets and adapted by frictional contact to seize upon the surface of a sheet when the sheet is pressed against it, means to separate an edge of a sheet from the pack and press it against said cylinder or drum whereby the sheet may be withdrawn to a greater or less extent from the pack, an auxiliary withdrawing-roller adapted to press the partially-withdrawn sheet against the said cylinder or drum and to assist in withdrawing the sheet from the pack, movable bearings for said roller and means to move said auxiliary roller out of contact with the drum when the machine is not in operation, consisting of the collars 164, handles 165, fixed cams 166 and projections 167.

38. In a machine for feeding sheets from a pack, the combination of a device for withdrawing the sheets successively from the pack, a blade extending across the machine adapted to make contact with the pack of sheets across its rearmost edge and a spring adapted to press the blade against the pack of sheets, for the purpose described, a shaft extending across the machine, adjustable frames carrying said blade, said spring and said shaft, guideways for supporting said adjustable frames, pinions carried by said shaft, fixed racks adapted to said pinions, and a hand device for turning said shaft whereby said pinions may act on said racks to cause the said frames and the parts carried thereby to move in the direction of the length of the pack to adjust said blade relatively to the rear edge of the pack.

39. In a machine for feeding sheets from a pack, the combination of a device for withdrawing the sheets successively from the pack, a fixed shaft or bar extending transversely across the machine, a blade pivoted upon said shaft or bar and adapted to make contact with the pack of sheets across its rearmost edge, a spring connecting said blade to said shaft or bar and adapted to cause the blade to press upon the pack of sheets for the purpose described, the shaft 172, the carriages 173, 173ª, carrying bearings which support the said shaft or bar and the shaft 172, flanges carried by the machine-frame adapted to support said carriages and upon which the carriages may freely move, the racks 180 and 180ª, pinions 182, 182ª, carried by said shaft 172 and adapted to said racks, a hand device for turning said shaft 172 whereby said pinions may act on said racks to cause the said carriages and the parts carried thereby to move in the direction of the length of the pack to adjust said blade relatively to the rear edge of the pack and means to secure said carriages in any adjusted position.

40. In a machine for feeding sheets from a pack, the combination of a device for withdrawing the sheets successively from the pack, a blade extending across the machine pivoted upon a fixed transverse axis and adapted to make contact with the pack of sheets across its rearmost edge, a spring adapted to press the blade against the pack of sheets, for the purpose described, a transversely-arranged shaft or bar, a projection carried by said shaft or bar adapted to engage said blade when the shaft is oscillated but to pass out of the way of the blade when the blade presses upon the pack, a hand device to oscillate said shaft or bar to cause said projection to act upon and raise said blade when it is not required for pressing upon the pack, and means to secure said blade in a raised position.

41. In a machine for feeding sheets from a pack, the combination of a device for withdrawing the sheets successively from the pack, a blade extending across the machine pivoted upon a fixed transverse axis and adapted to make contact with the pack of sheets across its rearmost edge and a spring adapted to press the blade against the pack of sheets, for the purpose described, a shaft or bar extending transversely across the machine, a projection carried by said shaft or bar adapted to engage said blade when the shaft is oscillated but to pass out of the way of the blade when the blade presses upon the pack, a hand device to oscillate said shaft or bar to cause said projection to act upon and raise said blade when it is not required for pressing upon the pack, a locking device to secure said blade in a raised position, adjustable frames for supporting said blade, spring, shaft, hand device and locking device, and means to adjust said frames and the parts carried thereby in the direction of the length of the pack.

42. In a machine for feeding sheets from a pack, the combination of a device for withdrawing the sheets successively from the pack, a shaft or bar extending transversely across the machine and adapted at times to oscillate about its axis, a blade pivoted upon said shaft or bar and adapted to make contact with the pack of sheets across its rearmost edge, a spring connecting said blade to said shaft or bar and adapted to cause the blade to press upon the pack of sheets for the purpose described, means to secure said shaft or bar fixedly when the said blade is pressing upon the pack and to release the said shaft when it is to be oscillated, a projection fixed on said shaft or bar adapted to engage said blade when the shaft is oscillated but to pass out of the way of the blade when the blade presses upon the pack, a hand device to oscillate said shaft or bar to cause said projection to act upon and raise said blade when it is not required for pressing upon the pack and means to secure said blade in a raised position.

43. In a machine for feeding sheets from a pack, the combination of a device for withdrawing the sheets successively from the pack, a shaft or bar extending transversely across the machine and adapted at times to oscillate about its axis, a blade pivoted upon said shaft or bar and adapted to make contact with the pack of sheets across its rearmost edge, a spring connecting said blade to said shaft or bar and adapted to cause the blade to press upon the pack of sheets for the purpose described, means to secure said shaft or bar fixedly when the said blade is pressing upon the pack and to release the said shaft when it is to be oscillated, a projection fixed on said shaft or bar adapted to engage said blade when the shaft is oscillated but to pass out of the way of the blade when the blade presses upon the pack, a hand device to oscillate said shaft or bar to cause said projection to act upon and raise said blade when it is not required for pressing upon the pack, means to secure said blade in a raised position, and means to adjust said shaft or bar and the parts connected thereto in the direction of the length of the pack.

44. In a machine for feeding sheets from a pack, the combination of a device for withdrawing the sheets successively from the pack, the shafts 171 and 172, the blade 169 pivoted upon the shaft 171, the springs 188, the carriages 173, 173$^a$, bearings carried by said carriages to support the shafts 171 and 172, flanges carried by the machine-frame adapted to support and guide said carriages when they are moved, the racks 180, 180$^a$, pinions 182, 182$^a$ carried by the shaft 172 and adapted to said racks, a hand device for turning said shaft 172, the clamping-strap 186, means to secure the shaft 171 from turning in its bearings in said carriages or to release the shaft so that it may turn in its bearings, a projection fixed on the shaft 171 adapted to engage the blade 169, and a hand device to oscillate the shaft 171 when it is free in its bearings, all combined and operating substantially as and for the purpose described.

45. In a machine for feeding sheets from a pack, the combination of a device for withdrawing the sheets successively from the pack, the shaft 171 extending transversely across the machine near the rear edge of the pack, the collar 197 surrounding said shaft, means to secure the collar 197 fixedly in such manner that the said shaft may turn in the collar and at times to release the collar so that it may turn with the shaft, sockets 189$^a$ and 195 formed in said collar, the key 189 adapted to move in a slot cut in the shaft 171 and to enter the sockets 189$^a$ or 195, the blade 169 pivoted upon said shaft, a spring 188, and a projection 193 secured to said shaft, all combined and operated substantially as and for the purpose described.

46. In a machine for feeding sheets from a pack, the combination of a device for withdrawing the sheets successively from the pack, the shafts 171 and 172, the blade 169 pivoted upon the shaft 171, carriages 173, 173$^a$, bearings carried by said carriages to support the shafts 171 and 172, flanges carried by the machine-frame adapted to support and guide said carriages when they are moved, the racks 180, 180$^a$, pinions 182, 182$^a$, gear 183, hand-wheel 184, gear 185, strap 186, screw 187, springs 188, key 189, rod 190, button 191, projection 193 fixed to the shaft 171, collar 197, sockets 189$^a$ and 195 formed in said collar, and the set-screw 198, all combined and operating substantially as and for the purpose described.

47. In a machine for feeding sheets, the combination of a sheet-conveyer consisting of rotary frictional rollers arranged transversely across the machine in a series extending forward in the direction in which the sheets move, a frame or bar arranged above said conveyer, devices carried by said frame adapted to adjust the sheets upon the conveyer to proper longitudinal alinement, and means to support said frame and to adjust it transversely consisting of cross-bars extending transversely below said conveyer, supports connected to said frame and extending between adjacent rollers of the conveyer, shoe-pieces attached to said supports and movable on said cross-bars, and a hand-operated device adapted to operate upon said shoe-pieces to move them over said cross-bars.

48. In a machine for feeding sheets, the combination of the rotating frictional conveying-rollers 199, the cross-bars 200 located beneath said conveying-rollers, the longitudinal bar 201 arranged above said rollers, the standards 202 extending from said cross-bars upward between adjacent rollers of the conveyer to and supporting said longitudinal bar, the shoe-pieces 203 attached to said standards and movable on said cross-bars, the adjusting-screws 204, bosses 205, and wheels 207, sprockets 208, chain 209, and devices carried by said longitudinal bar adapted to adjust the sheets upon the conveyer to proper longitudinal alinement, all of the parts being combined in such manner that the devices which adjust the sheets may be adjusted across the machine when the said hand-wheels or either of them are operated, to adapt the said sheet-adjusting devices to sheets of different widths or in different positions.

49. In a machine for feeding sheets, the combination of a sheet-conveyer, a side gage adapted to engage the side edges of the sheets upon the conveyer, a frictional pad adapted to engage the surface of a sheet upon the conveyer, actuating devices adapted to move said pad to cause it to engage a sheet upon the conveyer and move it against the side gage, a shaft to drive said actuating devices, and means to drive said shaft with an intermittent rotary movement so as to give a quick stroke to the frictional pad when it engages a sheet and to permit the pad to remain at rest during the interval between one stroke and another.

50. In a machine for feeding sheets, the combination of a sheet-conveyer, a side gage adapted to engage the side edges of the sheets upon the conveyer, a frictional pad adapted to engage the surface of a sheet upon the conveyer, actuating devices adapted to move said pad to cause it to engage a sheet upon the conveyer and move it against the side gage, and means to drive said actuating device with an intermittent movement consisting of the shafts 211 and 217, disk 218 having a notch 219, gears 220 and 222, spring 221, and anti-friction-roller 223, combined and operating substantially as described.

51. In a machine for feeding sheets, the combination of a sheet-conveyer, a side gage adapted to engage the side edges of the sheets upon the conveyer, a frictional pad adapted to engage the surface of a sheet upon the conveyer, actuating devices adapted to move said pad to cause it to engage a sheet upon the conveyer and move it against the side gage, and means to drive said actuating devices with an intermittent movement consisting of the shafts 211 and 217, disk 218 having a notch 219, gears 220 and 222, spring 221, and anti-friction-roller 223, combined and operating substantially as described, an adjustable bar or frame arranged over the conveyer and adapted to support said side gage, frictional pad, actuating devices, shafts, disk, gears, spring, and roller, means to support said bar or frame and to adjust it and the parts carried thereby transversely across the machine to adapt the devices carried by the bar to sheets of different widths or in different positions, power-distributing devices carried by the machine, adjustable driving devices for operating said shaft 211, a power connection between said power-distributing devices and adjustable driving devices, and a connection between said adjustable bar or frame and the adjustable driving devices whereby they will move together and the power connection to the shaft 211 will not be broken by the adjusting of the frame which carries it.

52. In a machine for feeding sheets, the combination of a sheet-conveyer constructed with a transversely-disposed space or interval between one part of its carrying-surface and another part of it, a stop adapted to arrest a sheet momentarily as it is moved forward by the conveyer, a side-gage finger adapted to engage the side edge of a sheet upon the conveyer, a fixed surface arranged over said space or interval above the sheets passing upon the conveyer, and a frictional pad adapted to operate in said space or interval in the surface of the conveyer to press the arrested sheet against said fixed surface and to draw the sheet against said side-gage finger to register it.

53. In a machine for feeding sheets, the combination of a sheet-conveyer consisting of rollers arranged transversely across the machine in a series extending forward in the direction in which the sheets move, a stop adapted to arrest a sheet momentarily as it is moved forward by the conveyer, a side gage adapted to engage the side edge of a sheet upon the conveyer, a fixed surface arranged over a space or interval between adjacent rollers of and above the sheets passing upon the conveyer, and a frictional pad adapted to operate in the said space or interval to press the arrested sheet against said fixed surface and to draw the sheet against the side gage to register it.

54. In a machine for feeding sheets, the combination of a sheet-conveyer constructed with a transversely-disposed space or interval between one part of its carrying-surface and another part of it, a stop adapted to arrest a sheet momentarily as it is moved forward by the conveyer, a side-gage finger adapted to engage the side edge of a sheet upon the conveyer, a fixed surface arranged over said space or interval and above the sheets passing upon the conveyer, and a frictional pad adapted to operate in said space or interval in the surface of the conveyer to press the arrested sheet against said fixed surface and to draw the sheet against said side-gage finger to register it, an adjustable bar or frame arranged over the conveyer and adapted to support said gage-finger, fixed surface, and frictional pad, and means to adjust said bar or frame and the parts carried thereby transversely across the machine to place the parts carried by the bar or frame in position to operate on sheets of different widths or in different positions.

55. In a device for registering sheets, the combination of a side gage adapted to engage the side edge of a sheet, a finger-bar, a pivot carried by the end of said finger-bar, a frictional pad carried by said finger-bar, and having capacity to turn about said pivot, a stop carried by said finger-bar to limit the turning of said pad upon its pivot, means to operate said finger-bar to bring the pad into contact with a sheet to move it against said side gage, and a spring carried by said finger-bar adapted to hold said pad normally against said stop with a force sufficient to overcome the normal resistance to movement in the sheet but adapted in the event of the sheet being stopped by the side gage before the pad has ceased its movement toward the gage to yield and permit the pad to turn about its pivot and pass over the sheet without moving it.

56. In a device for moving sheets, the combination of the frictional pad 227, finger-bar 228, thimble 229, pivot 230, key 231, recess 232 in thimble 229, spring 233, and means to operate said finger-bar to bring the said pad into contact with a sheet to move it, all combined and operating to cause the pad 227 to move the sheet until the resistance to movement in the sheet exceeds the tension of the spring 233 and thereafter to roll upon the sheet without moving it.

57. In a machine for feeding sheets, the combination of a sheet-conveyer, a stop adapted to arrest a sheet momentarily as it is moved forward by the conveyer, a side gage adapted to engage the side edge of a sheet upon the conveyer, a finger-bar, a frictional pad, a pivotal connection between said frictional pad and said finger-bar, a stop carried by said finger-bar to limit the turning of said pad upon its pivotal connection, means to operate said finger-bar to bring the said pad into contact with a sheet to move it against said side gage, a fixed surface arranged adjacent to the sheet and adapted to hold the sheet against the pressure of said frictional pad when the pad contacts with the sheet, and a spring carried by said finger-bar adapted to hold said pad normally against said stop with a force sufficient to overcome the normal resistance to movement in the sheet and adapted, in the event of the edge of the sheet reaching the side gage before the pad has ceased its movement toward the gage, to yield and allow the pad to turn about its pivotal connection and roll upon the sheet without further moving it.

58. In a machine for feeding sheets, the combination of a sheet-conveyer constructed with a transversely-disposed space or interval between one part and another of its carrying-surface, a stop adapted to arrest a sheet momentarily as it is moved forward by the conveyer, a side gage adapted to engage the side edge of a sheet upon the conveyer, a fixed surface arranged over said space or interval above the sheets passing upon the conveyer, a frictional pad adapted to operate in said space or interval in the surface of the conveyer to press the arrested sheet against said fixed surface and to draw the sheet against said side gage, and means to operate said pad consisting of the finger-bar 228, links 235 and 236 each pivoted to a fixed part, bar 237, eccentric-strap 238, eccentric 239, spring 240, lug 241, stop 242, shaft 217, and means to drive the shaft 217 with an intermittent rotary motion.

59. In a machine for feeding sheets, the combination of a sheet-conveyer consisting of rollers 199, a stop adapted to arrest a sheet momentarily as it is moved forward by the conveyer, a series of side-gage fingers 225, a series of brackets 226, a series of frictional pads 227, operating devices to cause each pad to move in a space or interval between adjoining rollers 199 to press the arrested sheet against one of said brackets and to cause the several pads by their combined action to move the sheet against the side-gage fingers, an adjustable bar or frame arranged over the conveyer and adapted to support said gage-fingers, brackets, frictional pads and the devices which operate them, and means to support said bar or frame and to adjust it and the parts carried thereby transversely across the machine to adapt the parts carried by the bar or frame to operate on sheets of different widths or in different positions.

60. In a machine for feeding sheets, the combination of a sheet-conveyer constructed with a transversely-disposed space or interval between one part and another of its carrying-surface, a stop adapted to arrest a sheet momentarily as it is moved forward by the conveyer, a side gage adapted to engage the side edge of a sheet upon the conveyer, a fixed surface arranged over said space or interval above the sheets passing upon the conveyer, a frictional pad adapted to operate in said space or interval in the surface of the conveyer to press the arrested sheet against said fixed surface and to draw the sheet against said side gage, and means to operate said pad consisting of the finger-bar 228, links 235 and 236 each pivoted to a fixed part, bar 237, eccentric-strap 238, eccentric 239, spring 240, lug 241, stop 242, shaft 217, and means to drive the shaft 217 with an intermittent rotary motion, and a clutch device adapted to connect and disconnect said eccentric 239 with the shaft 217 to cause the frictional pad to act or to cease to act upon the sheets as may be desired.

61. In a machine for feeding sheets, the combination of a sheet-conveyer constructed with a series of transversely-disposed spaces or intervals between different portions of its carrying-surface, a stop adapted to arrest a sheet momentarily as it is moved forward by the conveyer, a series of side-gage fingers projecting into said spaces or intervals, a series of fixed surfaces each arranged over one of said spaces or intervals above the sheets passing upon the conveyer, a series of frictional pads, a series of independent operating devices to cause each frictional pad to move in one of said spaces or intervals to press the arrested sheet against one of said fixed surfaces and to cause the several pads by their combined action to move the sheet against the side-gage fingers, power devices to drive said operating devices, and a disengaging device between each operating device and the said power devices whereby any one or several of said operating devices may be disengaged from the power devices to cause the frictional pad or pads controlled by said disengaged operating device or devices to cease from acting upon the sheets.

62. In a machine for feeding sheets, the combination of two frictional rollers adapted to pass or feed sheets successively between them one of the rollers consisting of a series of disks mounted on a thin and flexible shaft, a bar arranged parallel to said shaft, a series of bearings adapted to said shaft at intervals along its length, a pivotal connection between each of said bearings and said bar, whereby each bearing may oscillate about its pivot to and from the opposite roller, and a spring connecting each of said bearings to said bar all combined and arranged to cause the said disks to press against the opposite roller with a uniform but yielding pressure whereby the disks may conform individually to irregularities in the thicknesses of the sheets passing between the rollers.

63. In a machine for feeding sheets, the combination of two frictional rollers adapted to pass or feed sheets successively between them one of the rollers consisting of a series of spools each spool carrying a frictional disk at each end and each spool mounted by a narrow central portion upon a thin and flexible shaft, a bar arranged parallel to said shaft, a series of bearings adapted to said shaft at intervals along its length each provided with oppositely-disposed lugs or projections, a pivotal connection between one of said lugs or projections on each bearing and said bar, and a spring connecting each of said bearings to said bar through the medium of the lug or projection on each bearing opposite its pivotal connection with the bar, all combined and arranged to cause the said disks to press against the opposite roller with a uniform but yielding pressure whereby the disks may conform individually to irregularities in the thicknesses of the sheets passing between the rollers.

64. In a machine for feeding sheets, the combination of two frictional rollers adapted to pass or feed sheets successively between them one of the rollers consisting of a series of spools each spool carrying a frictional disk at each end and each spool mounted by a narrow central portion upon a thin and flexible shaft, a bar arranged parallel to said shaft, a series of bearings adapted to said shaft at intervals along its length each provided with oppositely-disposed lugs or projections, a pivotal connection between one of said lugs or projections on each bearing and said bar, and a spring connecting each of said bearings to said bar through the medium of the lug or projection on each bearing opposite its pivotal connection with the bar, all combined and arranged to cause the said disks to press against the opposite roller with a uniform but yielding pressure whereby the disks may conform individually to irregularities in the thicknesses of the sheets passing between the rollers, and a series of threaded plugs passing through said bar, each plug being arranged opposite to and adapted to bear upon and adjust the tension of one of said springs.

65. In a machine for feeding sheets, the combination of two frictional rollers adapted to pass or feed sheets successively between them one of the rollers consisting of a series of disks mounted on a thin and flexible shaft, a bar arranged parallel to said shaft, a series of bearings adapted to said shaft at intervals along its length, a pivotal connection between each of said bearings and said bar, whereby each bearing may oscillate about its pivot to and from the opposite roller, and a spring connecting each of said bearings to said bar all combined and arranged to cause the said disks to press against the opposite roller with a uniform but yielding pressure whereby the disks may conform individually to irregularities in the thicknesses of the sheets passing between the rollers, and a device adapted to swing said bearings about their pivotal connections to separate the rollers one from another and to maintain the rollers permanently separated when they are not to act upon the sheets, for the purpose described.

66. In a machine for feeding sheets, the combination of the frictional feeding-rollers 252 and 254, the roller 254 consisting of disks 255 mounted on a thin and flexible shaft, the bar 257, bearings 258, lugs 259 and 260, pendants 261, springs 262, plugs 263, clamp 264, rods 265, buttons 266, bar 267, arms 268, lugs 269, rod 270, handle 271, a cam projection 272, and nuts 273, all combined and operating substantially as and for the purpose described.

67. In a sheet-feeding machine, the combination of a sheet-conveyer, lower and upper feeding-disks adapted to receive the sheets from the conveyer and to deliver them to such devices as are to further act upon them, vertically-vibrating stop-fingers adapted to engage the front edges of the sheets successively to arrest them in their forward movement with the front edges of the sheets near to the intaking-line between the lower and upper feeding-disks and on that side of said line on which the sheets approach the disks, a shaft to carry the lower feeding-disks, a shaft to carry the upper feeding-disks, bearings for each of said shafts, oscillating frames 256 carrying the bearings of the shaft of the upper feeding-disks, the rocker-bar 282 carrying the said stop-fingers and means to oscillate said frames 256 and to rock the bar 282, consisting of the shaft 277, cams 278, arms 279, springs 281, arms 287, flanges 288, and springs 290, all combined and operating substantially as described to regulate the delivery of the sheets from the conveyer to the feeding-disks.

In testimony of which invention I hereunto set my hand.

JOHN HENRY KNOWLES.

Witnesses:
ERNEST HOWARD HUNTER,
THOS. L. EVANS.